(12) United States Patent
Shinohara et al.

(10) Patent No.: US 7,021,059 B2
(45) Date of Patent: Apr. 4, 2006

(54) HEAT EXCHANGE SYSTEM

(75) Inventors: Masashi Shinohara, Wako (JP); Tsuneo Endoh, Wako (JP); Atsushi Baba, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/496,125

(22) PCT Filed: Nov. 1, 2002

(86) PCT No.: PCT/JP02/11472

§ 371 (c)(1),
(2), (4) Date: Oct. 15, 2004

(87) PCT Pub. No.: WO03/044344

PCT Pub. Date: May 30, 2003

(65) Prior Publication Data

US 2005/0056396 A1 Mar. 17, 2005

(30) Foreign Application Priority Data

Nov. 21, 2001 (JP) ............................. 2001-356655

(51) Int. Cl.
*F01K 23/10* (2006.01)
*F01N 5/02* (2006.01)
*F02G 5/02* (2006.01)
*F28D 7/00* (2006.01)

(52) U.S. Cl. .................... 60/618; 60/653; 60/676; 165/139; 165/145

(58) Field of Classification Search ............... 60/618, 60/653, 676, 616, 320, 321; 165/139, 144, 165/145
See application file for complete search history.

(56) References Cited

U.S. PATENT DOCUMENTS 3,350,876 A * 11/1967 Johnson ..................... 60/618

FOREIGN PATENT DOCUMENTS

JP 57-166495 A 10/1982

(Continued)

*Primary Examiner*—Sheldon J Richter
(74) *Attorney, Agent, or Firm*—Birch, Stewart, Kolasch & Birch, LLP

(57) ABSTRACT

A heat exchange system is provided in which low temperature water from a supply pump (15) is split and supplied to an auxiliary evaporator (17) provided so as to cover an exhaust port (16) extending from a combustion chamber of an internal combustion chamber (E) and to a main evaporator (11) provided downstream of the exhaust port (16). The direction of water flowing through the auxiliary evaporator (17) is parallel to the direction of flow of exhaust gas, and as a result an upstream section of the exhaust port (16), which has a high temperature, can be cooled effectively with low temperature water, and the escape of heat from the upstream section of the exhaust port (16) can be suppressed. The direction of water flowing through the main evaporator (11) is opposite to the direction of flow of exhaust gas, thus ensuring that there is a temperature difference between the water and the exhaust gas along the whole length of the water passage of the main evaporator (11) and enabling the heat exchange efficiency to be improved.

17 Claims, 21 Drawing Sheets

U.S. PATENT DOCUMENTS

| | | | |
|---|---|---|---|
| 4,190,102 A * | 2/1980 | Gerz | 165/139 |
| 4,513,572 A | 4/1985 | Bonnaud et al. | 60/618 |
| 4,838,027 A * | 6/1989 | Rosado et al. | 60/671 |
| 6,823,668 B1 * | 11/2004 | Endoh et al. | 60/320 |
| 6,845,618 B1 * | 1/2005 | Niikura et al. | 60/618 |
| 6,854,263 B1 * | 2/2005 | Bruck et al. | 60/320 |

FOREIGN PATENT DOCUMENTS

| | | |
|---|---|---|
| JP | 08 014606 A | 1/1996 |
| JP | 2001-207839 A | 8/2001 |
| JP | 2001-289042 A | 10/2001 |
| WO | WO 01/53671 A1 | 7/2001 |

* cited by examiner

DIRECTION OF FLOW OF EXHAUST GAS

HEAT EXCHANGE SYSTEM

FIELD OF THE INVENTION

The present invention relates to a heat exchange system for recovering with a heat medium the thermal energy of a high temperature fluid flowing through the interior of a fluid passage extending from a heat source.

BACKGROUND ART

An evaporator that carries out heat exchange between exhaust gas of an internal combustion engine and water so as to heat the water by the heat of the exhaust gas and generate high temperature, high pressure steam is known from Japanese Patent Application Laid-open No. 2001-207839.

This evaporator improves the heat exchange efficiency by making the water flow in a direction opposite to the direction of flow of the exhaust gas, which is discharged from a combustion chamber of the internal combustion engine, that is, from the downstream side to the upstream side of the flow of exhaust gas, thus ensuring that there is a temperature difference between the exhaust gas and the water along the whole of a water passage.

However, in the above-mentioned conventional evaporator, since the flow of exhaust gas and the flow of water are opposite to each other, the temperature of water flowing through the water passage in the vicinity of the upstream end of an exhaust port (that is, the downstream end of the water passage) has already been increased, and it is difficult to cool the hottest section at the upstream end of the exhaust port sufficiently. Because of this, the heat of the high temperature exhaust port dissipates via the cylinder head, and the efficiency of recovery of the waste heat of the internal combustion engine is degraded, which is a problem. In order to avoid this problem, making the direction of flow of the exhaust gas and the direction of flow of the water parallel to each other enables the upstream end of the exhaust port, which reaches a high temperature, to be cooled effectively with low temperature water, but this results in an increase in the temperature of the water flowing through the downstream side of the exhaust port, where the temperature of the exhaust gas is low, and the temperature difference between the exhaust gas and water is therefore small in that section, thus degrading the heat exchange efficiency, which is a problem.

DISCLOSURE OF THE INVENTION

The present invention has been achieved under the above-mentioned circumstances, and it is an object of the present invention to reduce loss of thermal energy by suppressing the dissipation of heat from a heat source while maintaining the efficiency of heat exchange between a high temperature fluid discharged from the heat source and a heat medium.

In order to attain this object, in accordance with a first aspect of the present invention, there is proposed a heat exchange system for recovering with a heat medium the thermal energy of a high temperature fluid flowing through the interior of a fluid passage extending from a heat source, characterized in that the heat exchange system includes a first heat exchanger positioned on the upstream side of the fluid passage, and a second heat exchanger positioned on the downstream side of the fluid passage, the heat medium flows through the interior of a first heat medium passage, which is provided in the first heat exchanger, so as to be parallel to the flow of the high temperature fluid, the heat medium flows through the interior of a second heat medium passage, which is provided in the second heat exchanger, so as to oppose the flow of the high temperature fluid, and the downstream side of the first heat medium passage merges with the second heat medium passage.

In accordance with this arrangement, with regard to the first heat exchanger that is positioned on the upstream side of the fluid passage and through which the high temperature fluid flows, since the heat medium flows through the interior of the first heat medium passage so as to be parallel to the flow of the high temperature fluid, an upstream section of the fluid passage, which has a high temperature since it is close to the heat source, can be cooled effectively with the heat medium at a low temperature, the escape of heat from the upstream section can be suppressed, thus enhancing the efficiency of recovery of thermal energy, a location that requires cooling can be cooled effectively, thus suppressing thermal expansion, and dimensional and positional precision, etc. can be maintained, thus ensuring the function of the location that requires cooling. With regard to the second heat exchanger positioned on the downstream side of the fluid passage, since the heat medium flows through the interior of the second heat medium passage so as to oppose the flow of the high temperature fluid, it is possible to ensure that there is a temperature difference between the heat medium and the high temperature fluid along the whole length of the second heat medium passage, thus improving the heat exchanger efficiency. In this way, by cooperation between the first and second heat exchangers it is possible to reduce the loss of thermal energy by suppressing dissipation of heat from the heat source while improving the heat exchange efficiency between the high temperature fluid and the heat medium.

Furthermore, in accordance with a second aspect of the present invention, in addition to the first aspect, there is proposed a heat exchange system wherein in a section where the first heat medium passage and the second heat medium passage merge, the temperature of the heat medium in the first heat medium passage and the temperature of the heat medium in the second heat medium passage are made substantially identical to each other.

In accordance with this arrangement, since the temperatures of the heat media are made substantially identical to each other in the section where the first and second heat medium passages merge, it is possible to minimize the loss of thermal energy caused when merging heat media having a temperature difference.

Moreover, in accordance with a third aspect of the present invention, in addition to the first or second aspect, there is proposed a heat exchange system wherein the heat source is a combustion chamber of an internal combustion engine, the high temperature fluid is exhaust gas discharged from the combustion chamber, and the first heat exchanger is provided in the vicinity of an exhaust port of the internal combustion engine.

In accordance with this arrangement, since the combustion chamber of the internal combustion engine is the heat source, the exhaust gas discharged from the combustion chamber is the high temperature fluid, and the first heat exchanger is provided in the vicinity of the exhaust port of the internal combustion engine, it is possible to recover effectively with the first heat exchanger the thermal energy of the exhaust gas discharged into the exhaust port from the combustion chamber of the internal combustion engine, suppress thermal expansion by cooling effectively a location that requires cooling, and ensure the function of the location that requires cooling by maintaining the dimensional and positional precision, etc.

Furthermore, in accordance with a fourth aspect of the present invention, in addition to the third aspect, there is proposed a heat exchange system wherein the first heat medium passage of the first heat exchanger is provided so as to cover the exhaust port of the internal combustion engine.

In accordance with this arrangement, since the exhaust port of the internal combustion engine is covered by the first heat medium passage of the first heat exchanger, it is possible to carry out heat exchange between the heat medium flowing through the first heat medium passage and the high temperature exhaust gas discharged into the exhaust port from the combustion chamber of the internal combustion engine, thus recovering the thermal energy of the exhaust gas effectively, minimizing the escape of heat by cooling the high temperature exhaust port effectively, suppressing thermal expansion by cooling effectively a location that requires cooling, and ensuring the function of the location that requires cooling by maintaining the dimensional and positional precision, etc.

Moreover, in accordance with a fifth aspect of the present invention, in addition to the fourth aspect, there is proposed a heat exchange system wherein an upstream section of the first heat medium passage cools a section of the exhaust port that requires cooling.

In accordance with this arrangement, since the upstream section of the first heat medium passage cools the section of the exhaust port that requires cooling, it is possible to cool effectively the section of the exhaust port that requires cooling by low temperature heat medium that has not yet fully carried out heat exchange, suppress thermal expansion by cooling effectively the location that requires cooling, and ensure the function of the location that requires cooling by maintaining the dimensional and positional precision, etc.

Furthermore, in accordance with a sixth aspect of the present invention, in addition to any one of the third to the fifth aspects, there is proposed a heat exchange system wherein the internal combustion engine includes a plurality of combustion chambers, the exhaust port includes a plurality of independent exhaust ports extending from the respective combustion chambers and a grouped exhaust port communicating with the downstream side of each of the plurality of independent exhaust ports, at least one section of the first heat exchanger is provided in the independent exhaust ports, and at least one section of the second heat exchanger is provided in the grouped exhaust port.

In accordance with this arrangement, since at least one section of the first heat exchanger is provided in each of the plurality of independent exhaust ports extending from the plurality of combustion chambers and at least one section of the second heat exchanger is provided in the grouped exhaust port in which the plurality of independent exhaust ports are combined, it is possible to carry out heat exchange between the exhaust gas and the heat medium throughout the whole of the independent exhaust ports and the grouped exhaust port.

An auxiliary evaporator 17 and a main evaporator 11 of an embodiment correspond to the first heat exchanger and the second heat exchanger of the present invention respectively, a combustion chamber 24 of the embodiment corresponds to the heat source of the present invention, an exhaust valve seat 29 and an exhaust valve guide 40 of the embodiment correspond to the section that requires cooling of the present invention, a water passage W2 of the embodiment corresponds to the first heat medium passage of the present invention, and a water passage W3 of the embodiment corresponds to the second heat medium passage of the present invention.

BRIEF DESCRIPTION OF THE DRAWINGS

FIG. 1 is a diagram showing the overall arrangement of a Rankine cycle system;

FIG. 2 is a vertical sectional view of the surroundings of a cylinder head of an internal combustion engine;

FIG. 3 is an enlarged view of a part 3 in FIG. 2;

FIG. 4 is a view from arrowed line 4—4 in FIG. 2;

FIG. 5 is a sectional view along line 5—5 in FIG. 4;

FIG. 6 is a sectional view along line 6—6 in FIG. 4;

FIG. 7 is a partially cutaway perspective view of an independent exhaust port;

FIG. 8 is a view from arrow 8 in FIG. 7;

FIG. 9 is a view from arrow 9 in FIG. 8;

FIG. 10 is a view from arrow 10 in FIG. 8;

FIG. 11A and FIG. 11B are schematic views showing the flow of water in a grouped exhaust port;

FIG. 12 is an enlarged sectional view of an essential part in FIG. 2;

FIG. 13 is a view from arrowed line 13—13 in FIG. 12;

FIG. 14 is a view from arrow 14 in FIG. 12;

FIG. 15 is a sectional view along line 15—15 in FIG. 12;

FIG. 16 is an enlarged view of a part 16 in FIG. 15;

FIG. 17 is a sectional view along line 17—17 in FIG. 14;

FIG. 18 is a sectional view along line 18—18 in FIG. 14;

FIG. 19 is a sectional view along line 19—19 in FIG. 14;

FIG. 20 is a sectional view along line 20—20 in FIG. 12;

FIG. 21 is a sectional view along line 21—21 in FIG. 12;

FIG. 22 is a diagram showing the flow of water in a main evaporator; and

FIG. 23 is a diagram showing the flow of exhaust gas in the main evaporator.

BEST MODE FOR CARRYING OUT THE INVENTION

An embodiment of the present invention is explained below with reference to FIG. 1 to FIG. 23.

Figure 1:
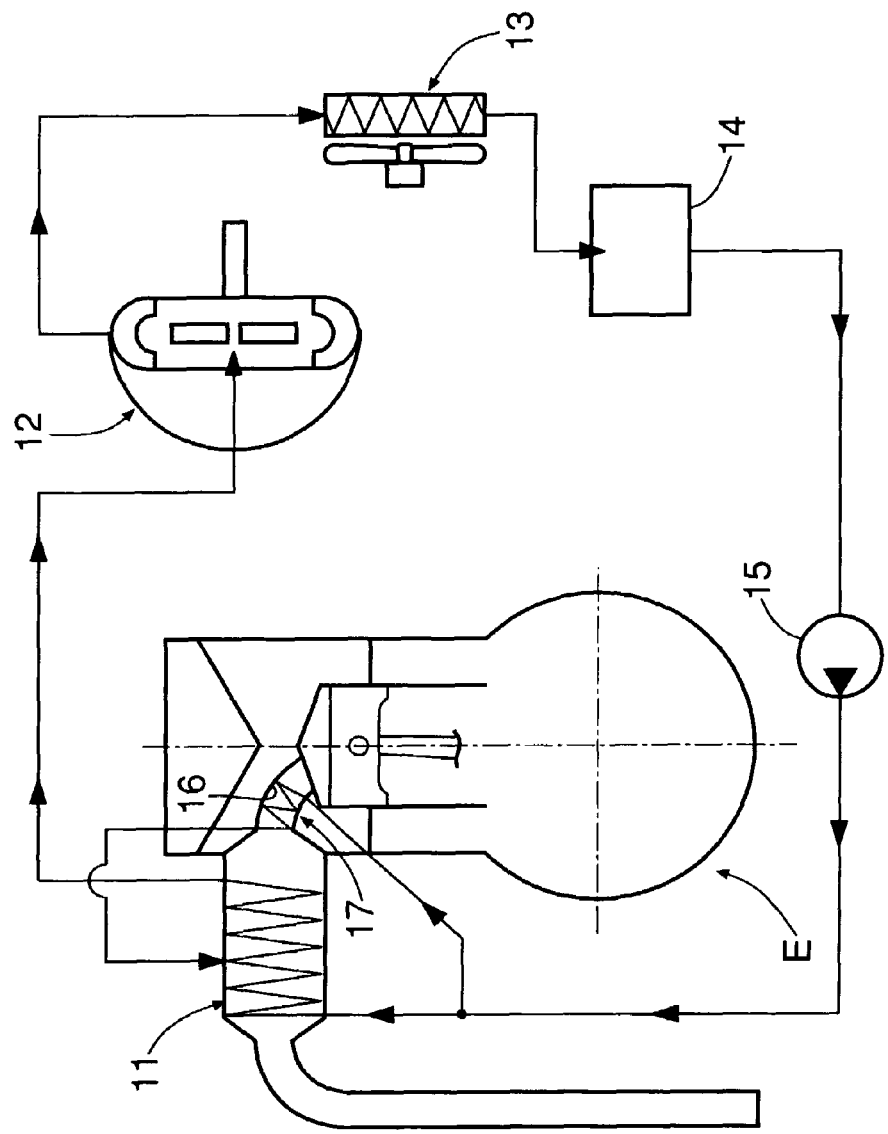
FIG. 1 to FIG. 23 show one embodiment of the present invention.

FIG. 1 shows the overall arrangement of a Rankine cycle system to which the present invention is applied.

The Rankine cycle system, which recovers the thermal energy of an exhaust gas of an internal combustion engine E and converts it into mechanical energy, includes a main evaporator 11 that heats water with exhaust gas discharged from the internal combustion engine E so as to generate high temperature, high pressure steam, an expander 12 that is operated by the high temperature, high pressure steam generated by the main evaporator 11 so as to generate mechanical energy, a condenser 13 that cools decreased temperature, decreased pressure steam that has completed work in the expander 12 so as to turn it back into water, a reservoir tank 14 for collecting water discharged from the condenser 13, and a supply pump 15 for pressurizing the water collected in the reservoir tank 14. A portion of the water discharged from the supply pump 15 is supplied to the main evaporator 11, which is provided downstream of an exhaust port 16 of the internal combustion engine E, turns into high temperature, high pressure steam in the main evaporator 11, and is supplied to the expander 12, and the rest of water discharged from the supply pump 15 is heated while passing through an auxiliary evaporator 17 provided on the outer periphery of the exhaust port 16, and then merges into the main evaporator 11 at a predetermined position.

The main evaporator 11 carries out heat exchange mainly with the exhaust gas discharged from the exhaust port 16 and generates steam, but the auxiliary evaporator 17 carries out heat exchange not only with the exhaust gas flowing through the exhaust port 16 but also with the exhaust port 16 itself, which is in contact with a high temperature exhaust gas, thus generating steam and simultaneously cooling the exhaust port 16.

Figure 2:
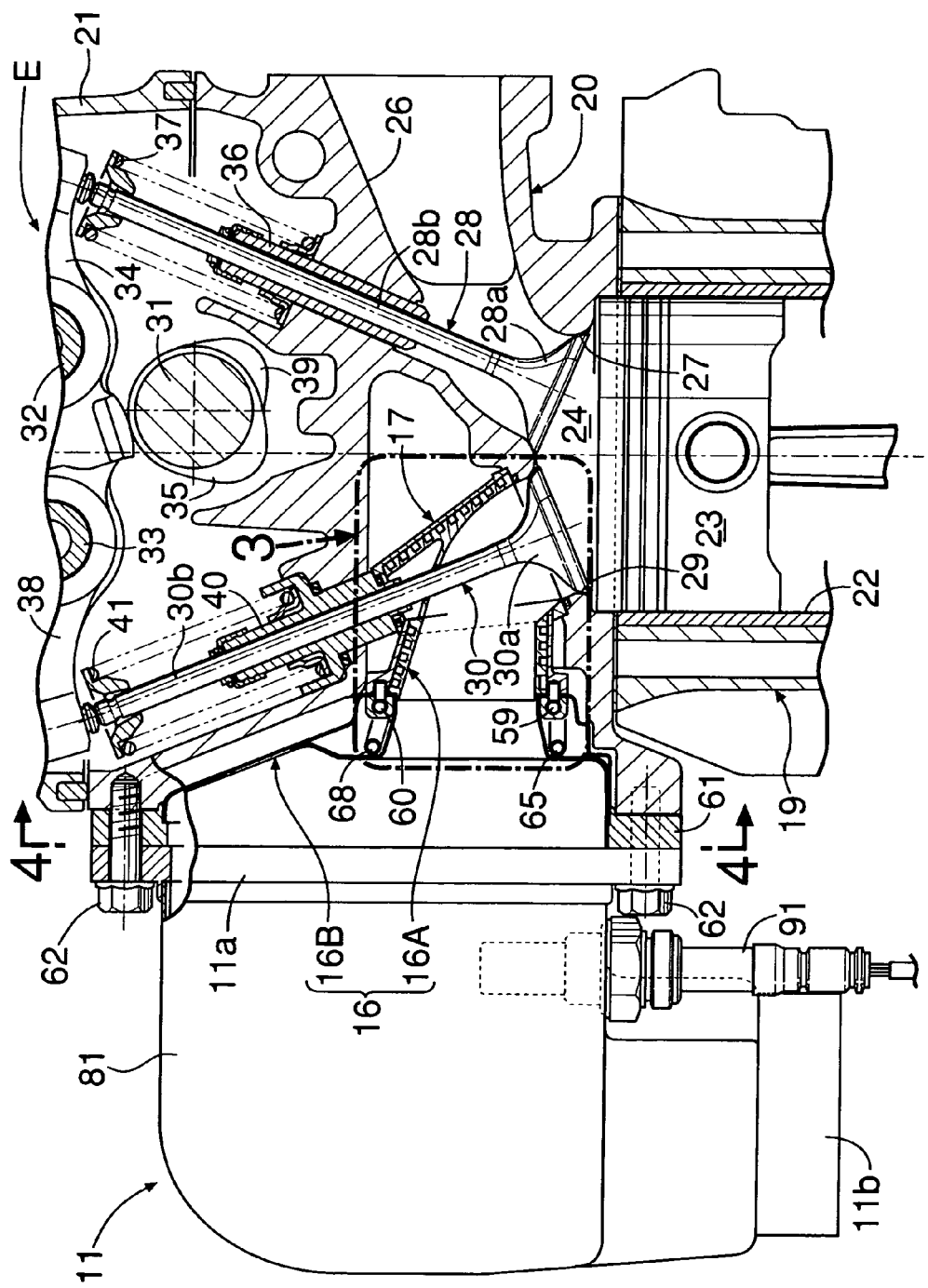

As shown in FIG. 2, a cylinder head 20 and a head cover 21 are joined to a cylinder block 19 of the in-line four-cylinder internal combustion engine E, and four combustion chambers 24 are formed between the lower face of the cylinder head 20 and the upper face of each of four pistons 23 slidably fitted in four cylinder sleeves 22 housed in the cylinder block 19. Formed in the cylinder head 20 are intake ports 26 and exhaust ports 16, which communicate with the corresponding combustion chambers 24. An intake valve seat 27 at the downstream end of the intake port 26 is opened and closed by a head 28a of an intake valve 28, and an exhaust valve seat 29 at the upstream end of the exhaust port 16 is opened and closed by a head 30a of an exhaust valve 30. Whereas the intake port 26 is formed directly in the cylinder head 20, the exhaust port 16 is formed from four independent exhaust ports 16A and one grouped exhaust port 16B, each thereof being made of a member that is separate from the cylinder head 20 and fitted in the cylinder head 20.

Supported on the cylinder head 20 are a single camshaft 31, a single intake rocker arm shaft 32, and a single exhaust rocker arm shaft 33. One end of an intake rocker arm 34 rockably supported by the intake rocker arm shaft 32 abuts against an intake cam 35 provided on the camshaft 31, and the other end thereof abuts against a stem 28b of the intake valve 28, which is slidably supported by an intake valve guide 36 provided in the cylinder head 20 and is urged upward by a valve spring 37. Furthermore, one end of an exhaust rocker arm 38 rockably supported by the exhaust rocker arm shaft 33 abuts against an exhaust cam 39 provided on the camshaft 31, and the other end thereof abuts against the upper end of a stem 30b of the exhaust valve 30, which is slidably supported by an exhaust valve guide 40 provided in the cylinder head 20 and is urged upward by a valve spring 41.

The exhaust port 16 is formed from the four independent exhaust ports 16A, which are positioned on the upstream side of the flow of exhaust gas, and the single grouped exhaust port 16B, which communicates with the downstream side of the independent exhaust ports 16A, and an end portion on the upstream side of the main evaporator 11 is fitted into the inside of the grouped exhaust port 16B. The auxiliary evaporator 17 is provided so as to straddle the independent exhaust ports 16A and the grouped exhaust port 16B communicating with the downstream side thereof.

Figure 3:
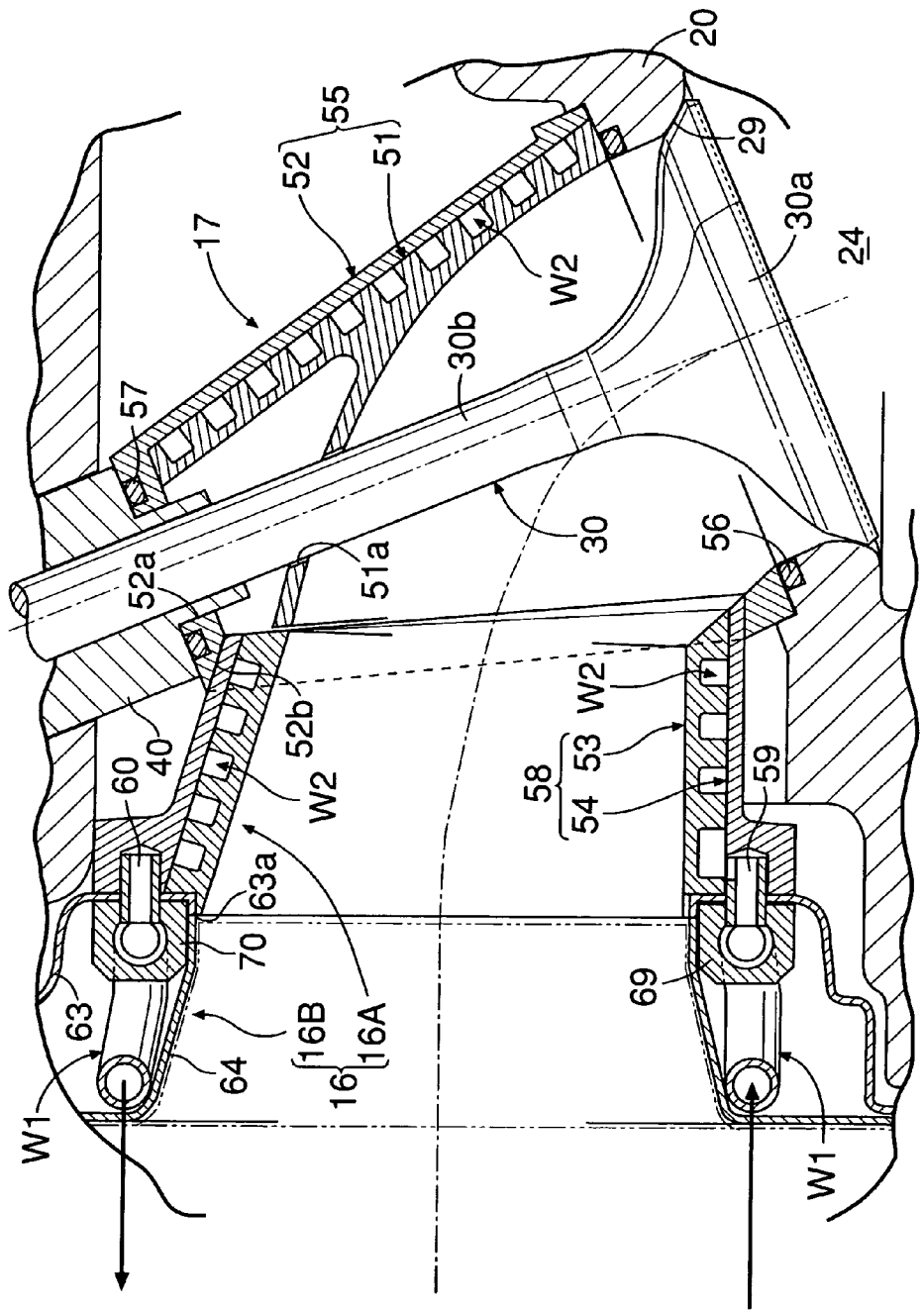
Figure 4:
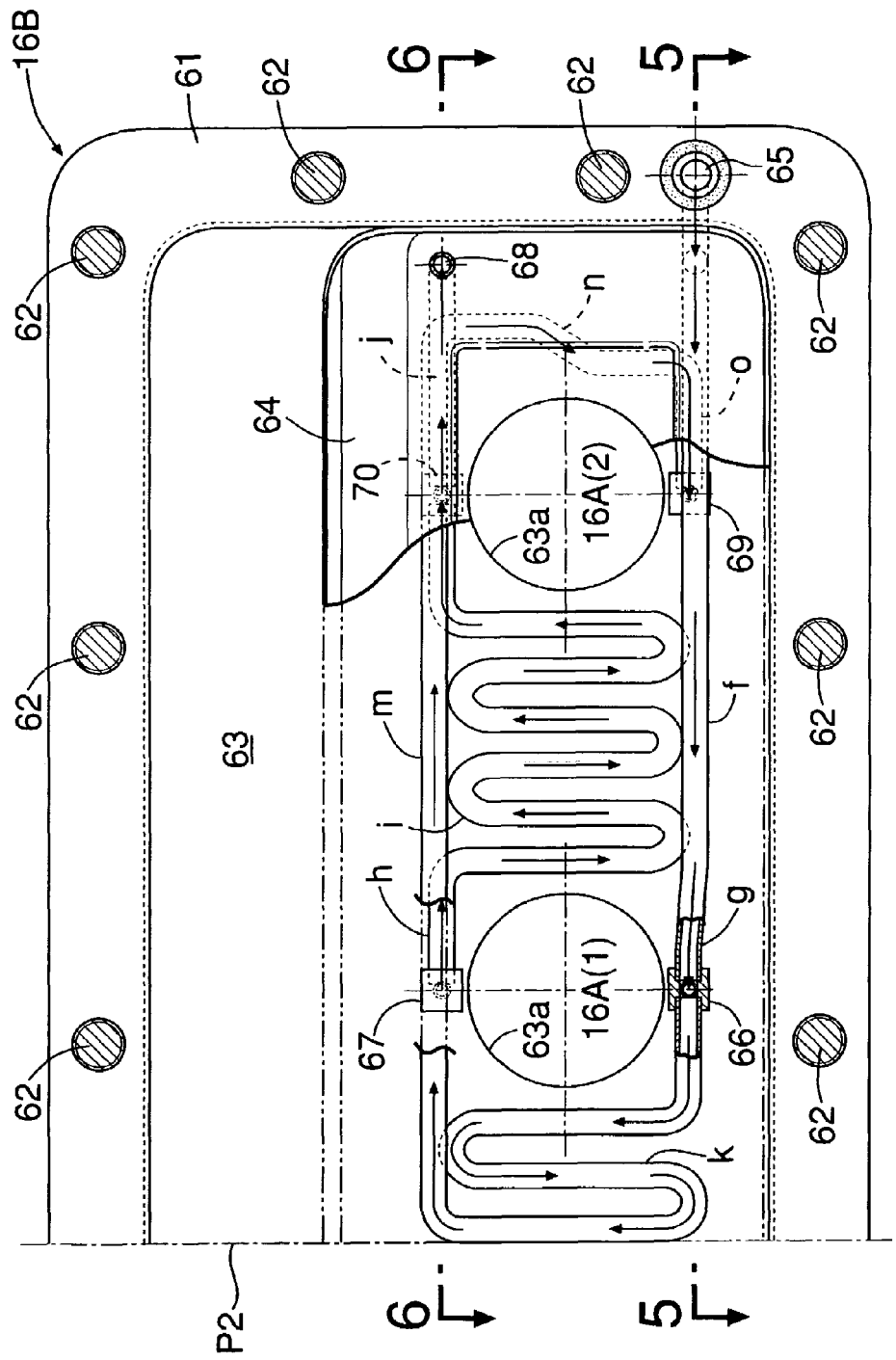
Figure 5:
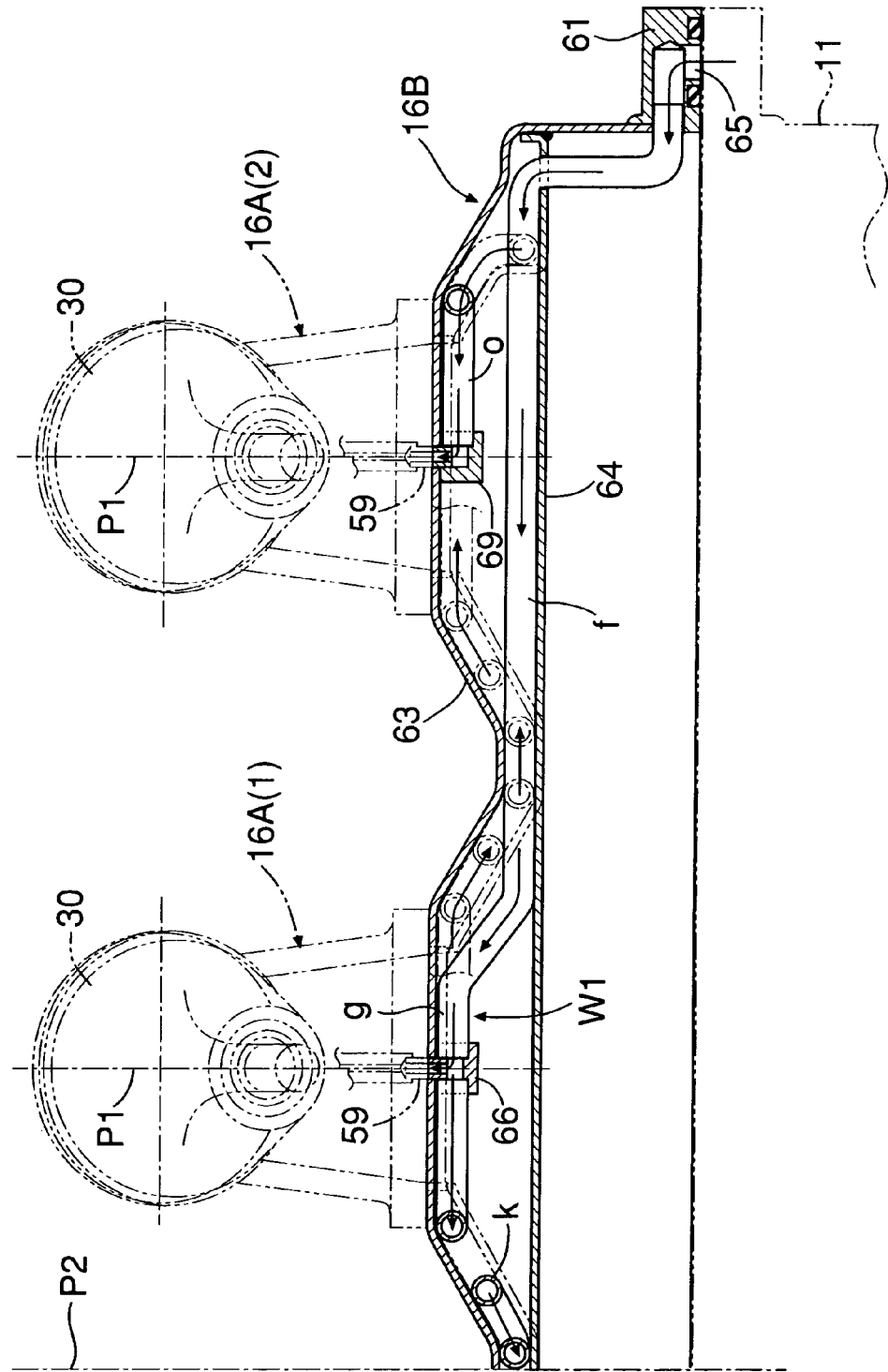
Figure 6:
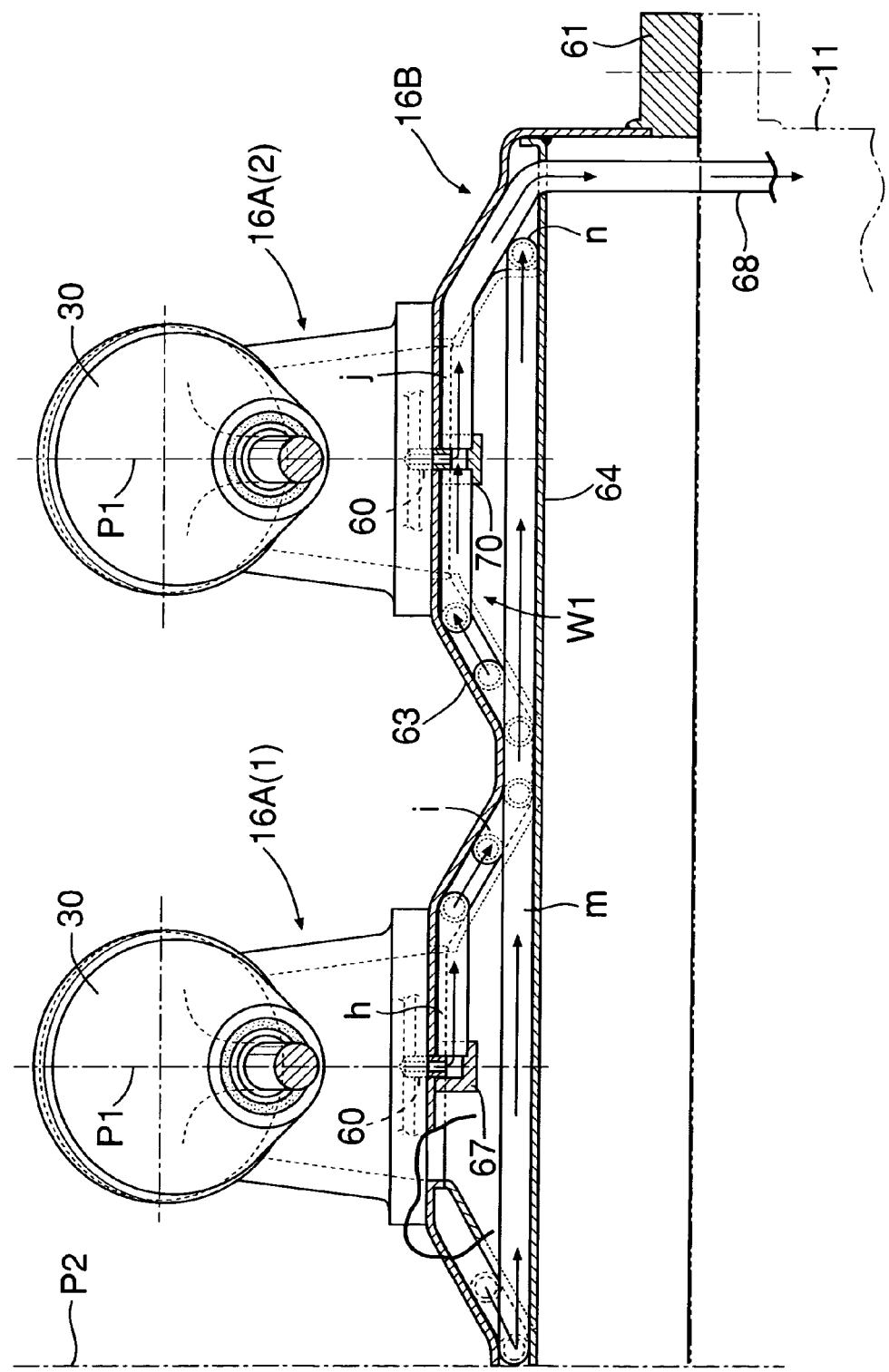
Figure 7:
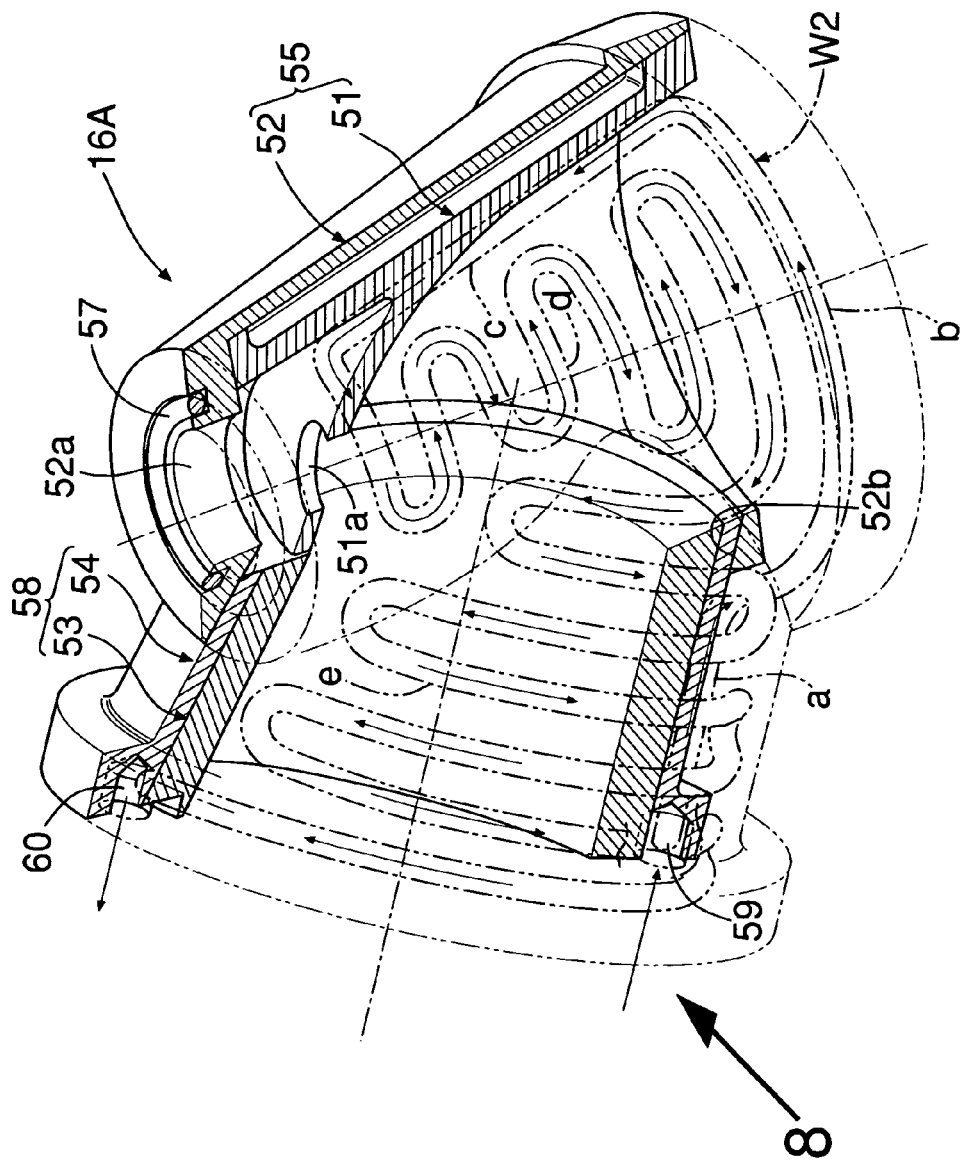

The structure of the independent exhaust ports 16A is first explained in detail with reference to FIG. 3 and FIG. 7.

The independent exhaust port 16A is formed from a first port member 51, a first cover member 52, a second port member 53, and a second cover member 54. The first port member 51 and the first cover member 52 form an upstream portion 55 of the independent exhaust port 16A that communicates with the combustion chamber 24, and have a structure in which the first port member 51, which is on the inside, is covered by the first cover member 52, which is on the outside, and a labyrinth-shaped water passage W2 is formed between the inner face of the first cover member 52 and a channel formed on the outer face of the first port member 51. The lower faces of the first port member 51 and the first cover member 52 abut against the upper face of the exhaust valve seat 29, which is formed in the cylinder head 20, via a seal 56. Moreover, an opening 51a through which the stem 30b of the exhaust valve 30 runs is formed in an upper wall of the first port member 51, and the lower end of the exhaust valve guide 40 is fitted via a seal 57 in an opening 52a formed on an upper wall of the first cover member 52.

The second port member 53 and the second cover member 54 form a downstream portion 58 of the independent exhaust port 16A, which communicates with the grouped exhaust port 16B, and have a structure in which the second port member 53, which is on the inside, is covered by the second cover member 54, which is on the outside, and the labyrinth-shaped water passage W2 is formed between the inner face of the second cover member 54 and a channel formed on the outer face of the second port member 53. An end portion of the second cover member 54 is fitted in an opening 52b formed in a side face of the first cover member 52, thereby joining the first port member 51 and the second port member 53 smoothly so as to define a curved passage for the exhaust gas. The water passage W2 defined by the second port member 53 and the second cover member 54 includes a water inlet 59 on the lower side thereof and a water outlet 60 on the upper side thereof.

Figure 8:
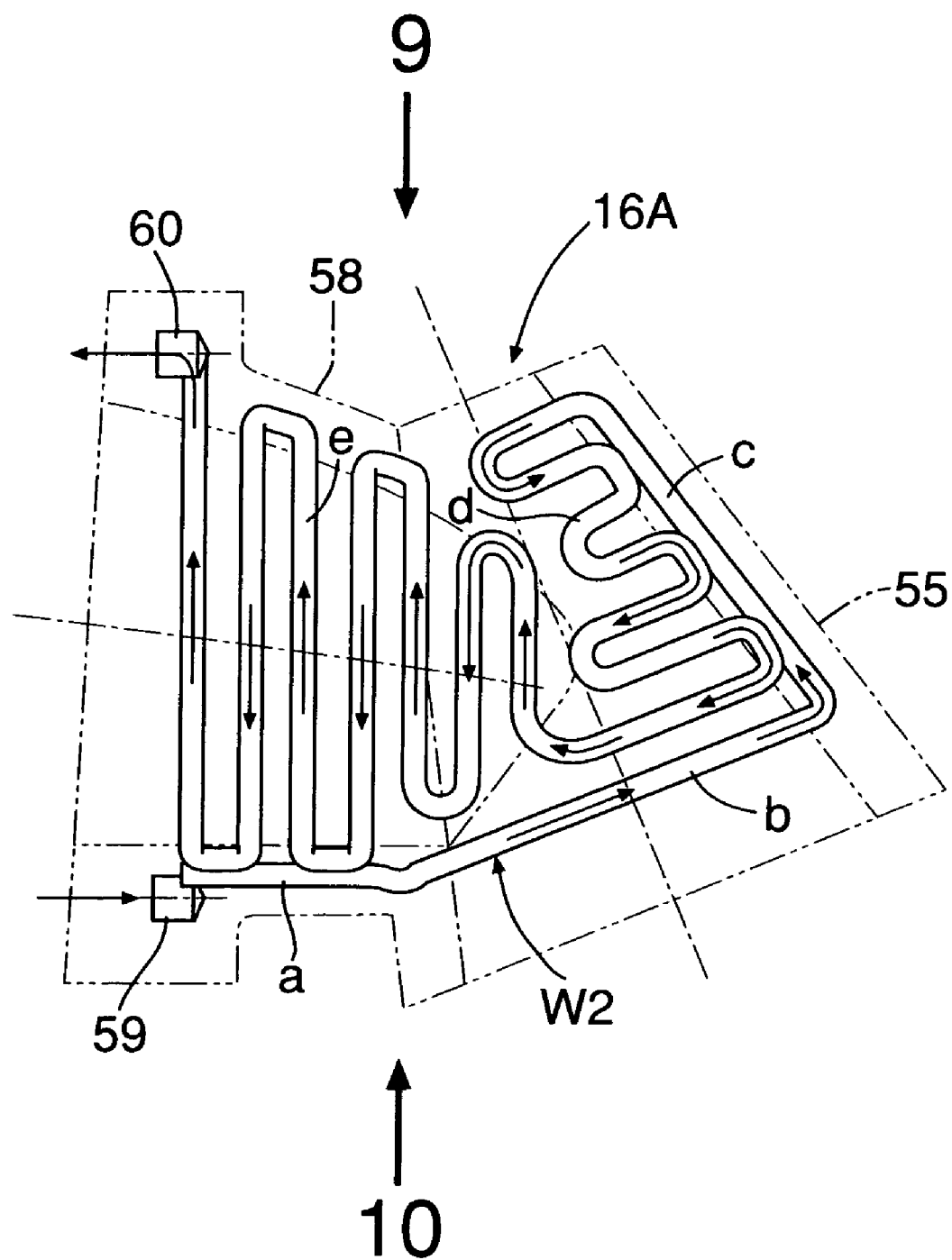
Figure 9:
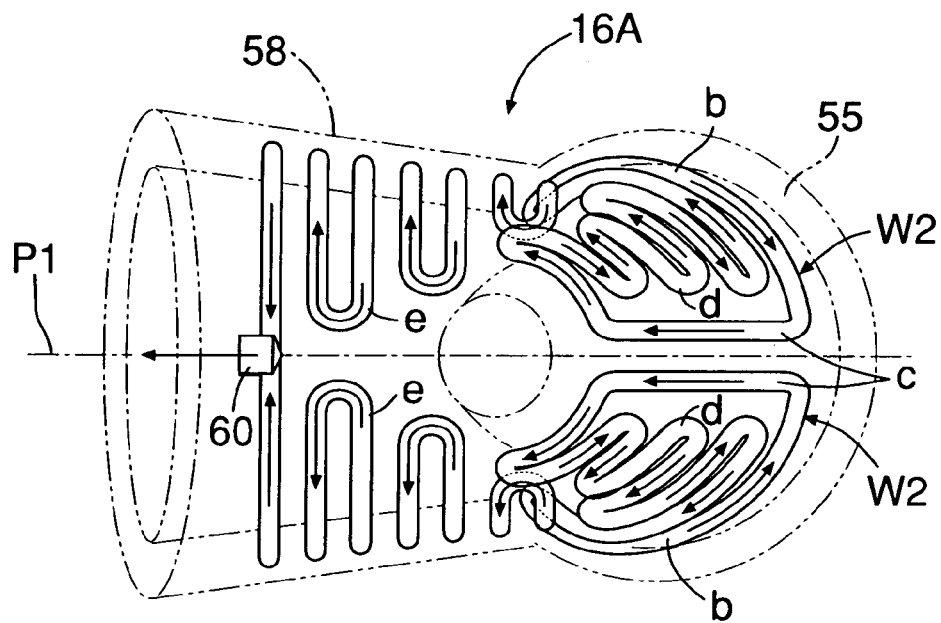
Figure 10:
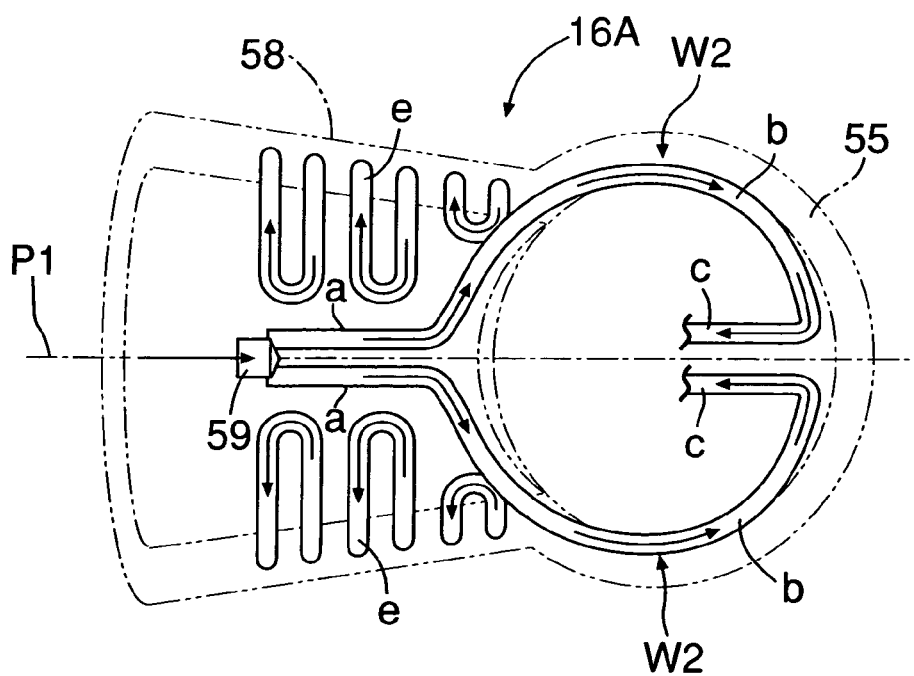
Figure 11:
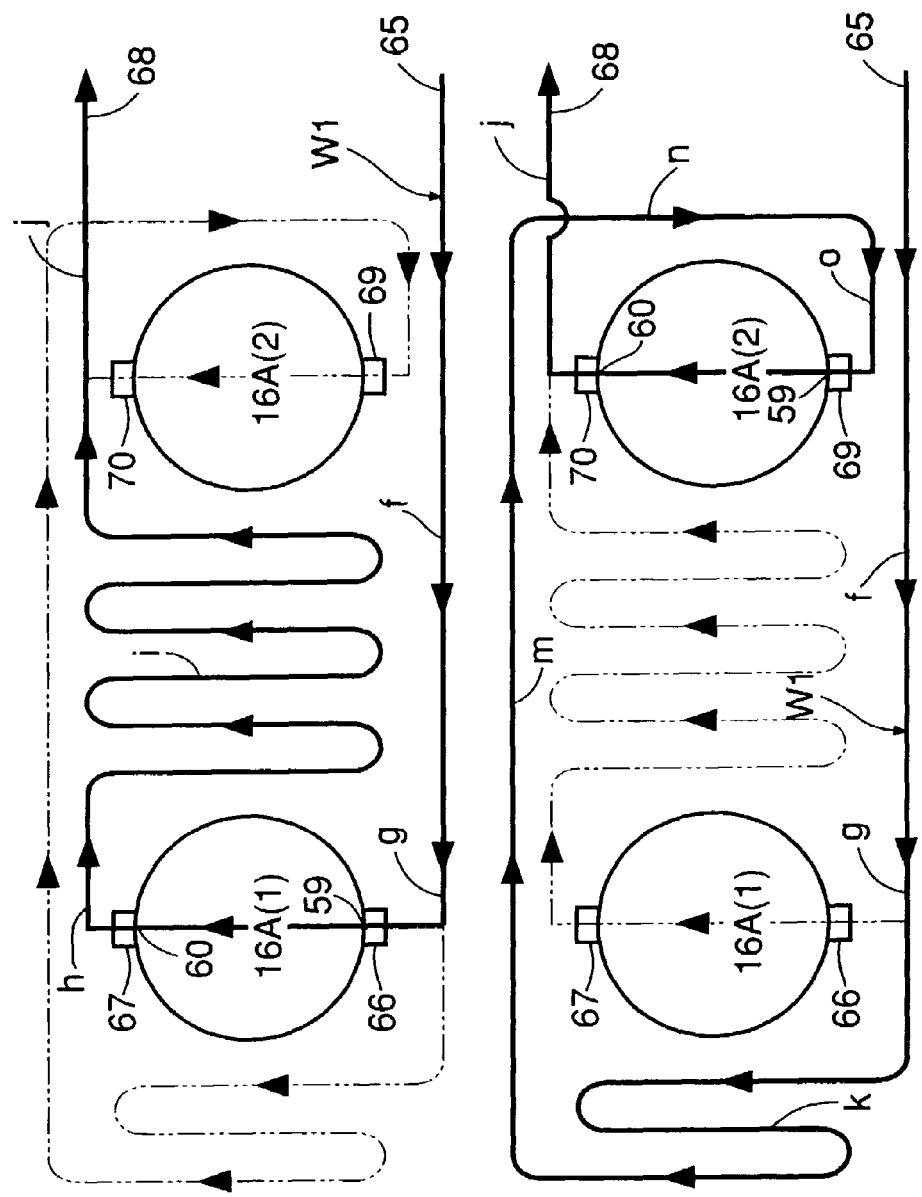

The shape of the water passage W2 of the independent exhaust port 16A is now explained with reference to FIG. 8 to FIG. 10.

The water passage W2 is formed with lateral symmetry relative to a plane of symmetry P1 of the independent exhaust port 16A; immediately after the water inlet 59 the water passage W2 branches into two lines so as to sandwich the plane of symmetry P1 and the two lines merge again immediately before the water outlet 60. To explain in more detail, the water passage W2 extends linearly from the water inlet 59 along a lower face of the downstream portion 58 (part a), moves therefrom to the upstream portion 55, extends in a semicircular shape around the head 30a of the exhaust valve 30 (part b), extends therefrom linearly upward along the stem 30b of the exhaust valve 30 up to the vicinity of the lower end of the exhaust valve guide 40 (part c), extends therefrom toward the head 30a of the exhaust valve 30 while bent in a zigzag shape (part d), returns therefrom back to the downstream portion 58, and extends toward the water outlet 60 while bent in a zigzag shape (part e).

The structure of the grouped exhaust port 16B is now explained in detail with reference to FIG. 2 to FIG. 6.

The grouped exhaust port 16B includes a rectangular frame-shaped flange 61, and by tightening a plurality of bolts 62 running through a flange 11a of the main evaporator 11 to the cylinder head 20 the main evaporator 11 and the grouped exhaust port 16B are together secured to the cylinder head 20 (see FIG. 2). The downstream end of a pressed sheet material third port member 63 is welded to the flange 61 of the grouped exhaust port 16B, and four openings 63a formed in the upstream end of the third port member 63 communicate with exits of the four independent exhaust ports 16A. The downstream end of a pressed sheet material fourth port member 64 is welded to an inner face of the third port member 63, and the upstream end of the fourth port member 64 is superimposed on the four openings 63a of the third port member 63 and welded. The exhaust gases discharged from the four independent exhaust ports 16A are therefore merged in the grouped exhaust port 16B, and guided evenly to the main evaporator 11.

Water passages W1, which are formed from a pipe material, are disposed in a space surrounded by the third port member 63 and the fourth port member 64 of the grouped exhaust port 16B. Since the water passages W1 have a symmetrical structure relative to a plane of symmetry P2, FIG. 4 to FIG. 6, FIG. 11A, and FIG. 11B show the water passage W1 on one side of the plane of symmetry P2. The water passage W1 has a first line passing through the independent exhaust port 16A(1) on the side close to the plane of symmetry P2 and a second line passing through the independent exhaust port 16A(2) on the side far from the plane of symmetry P2.

That is, the water passage W1 starting at a water inlet 65 provided on an end portion of the flange 61 extends linearly along an inner face of the fourth port member 64 (part f), and extends linearly therefrom along an inner face of the third port member 63 (part g). A coupling 66 is provided in the part g, and the water inlet 59 of the independent exhaust port 16A(1) is connected to this coupling 66. The water passage W1 extending from a coupling 67 to which the water outlet 60 of the independent exhaust port 16A(1) is connected extends linearly along the inner face of the third port member 63 (part h), extends therefrom along the inner face of the third port member 63 in a zigzag shape (part i), extends linearly therefrom along the inner face of the third port member 63 (part j), turns downward through 90°, and communicates with the water outlet 68. The water outlet 68 communicates with an intermediate portion of the main evaporator 11 via a connecting pipe 106, which will be described later.

The water passage W1 extending through the coupling 66 further extends along the inner face of the third port member 63 in a zigzag shape (part k), extends linearly along the inner face of the fourth port member 64 (part m), turns through 90°, extends linearly (part n), further turns through 90°, extends linearly along the inner face of the third port member 63 (part o), and is connected to the water inlet 59 of the independent exhaust port 16A(2) via a coupling 69 provided therein. A coupling 70 to which the water outlet 60 of the independent exhaust port 16A(2) is connected merges with the part j of the water passage W1.

The structure of the main evaporator 11 is now explained in detail with reference to FIG. 12 to FIG. 21.

The main evaporator 11, which communicates with the downstream side of the auxiliary evaporator 17, has a casing 81 fixed to its flange 11a, the cross section of the casing 81 being substantially rectangular, and an exhaust exit 11b communicating with an exhaust pipe 82 (see FIG. 13) is formed on a lower face of the casing 81. A large number of thin metal heat transfer plates 83 are disposed parallel to each other at a predetermined pitch within the casing 81. An exhaust gas purification catalyst for cleaning up the exhaust gas is supported on the surface of all of the heat transfer plates 83.

Figure 16:
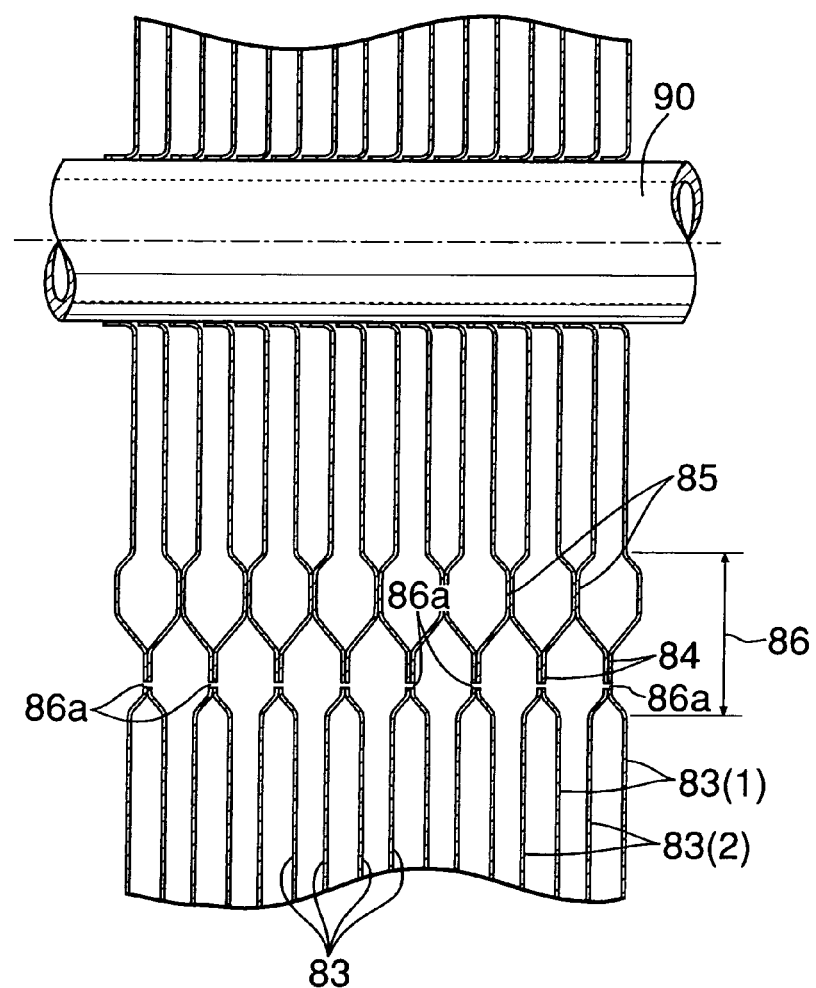

As is clear from FIG. 16, the heat transfer plate 83 is formed from a first heat transfer plate 83(1) and a second heat transfer plate 83(2) having plane-symmetric concavoconvex portions, and they are alternately superimposed. The first heat transfer plate 83(1) and the second heat transfer plate 83(2) thus make contact and are brazed to each other at abutment sections 84 and 85, and a partition wall 86 for blocking the circulation of exhaust gas is formed in this section.

Figure 12:
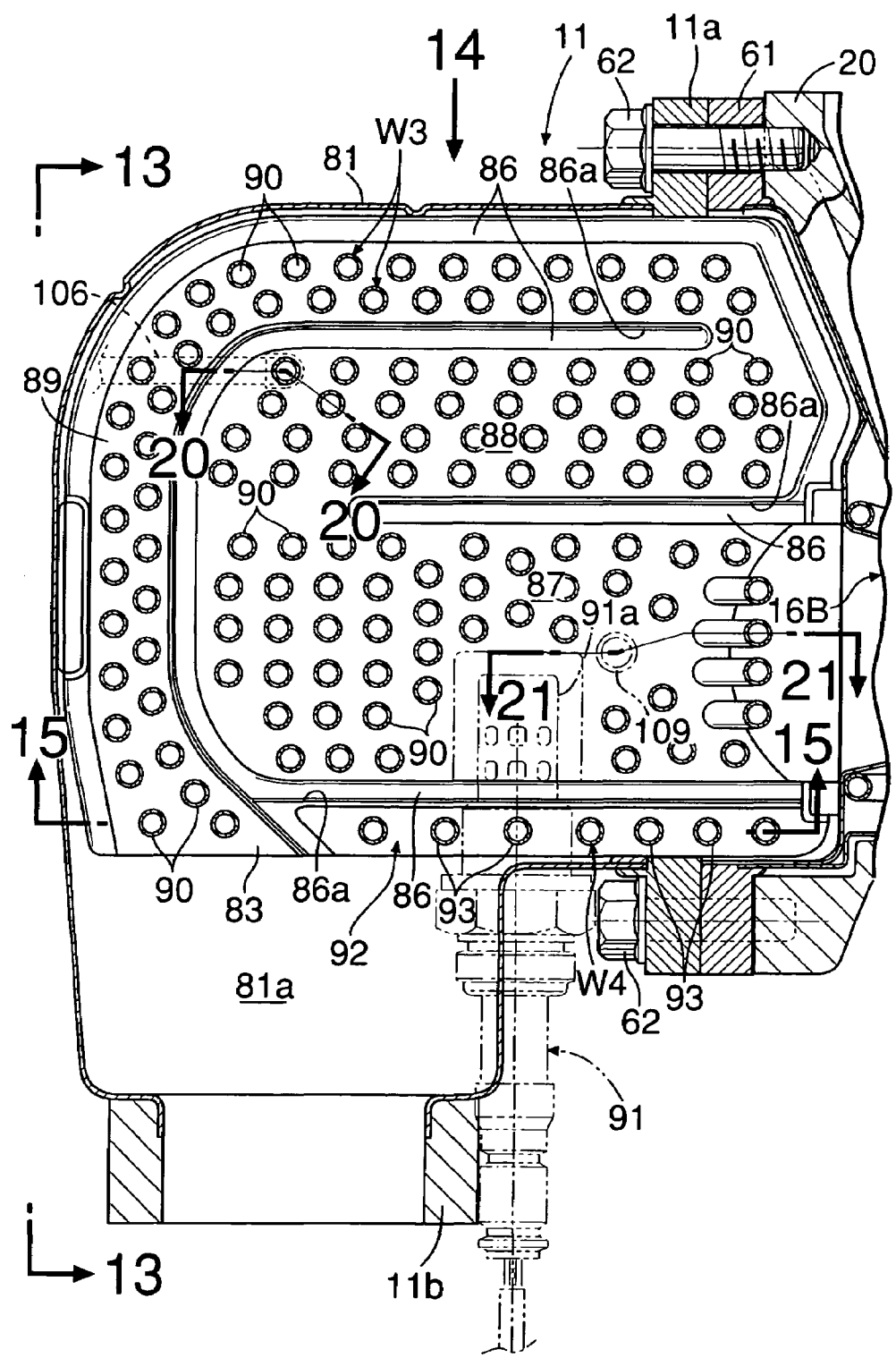
Figure 13:
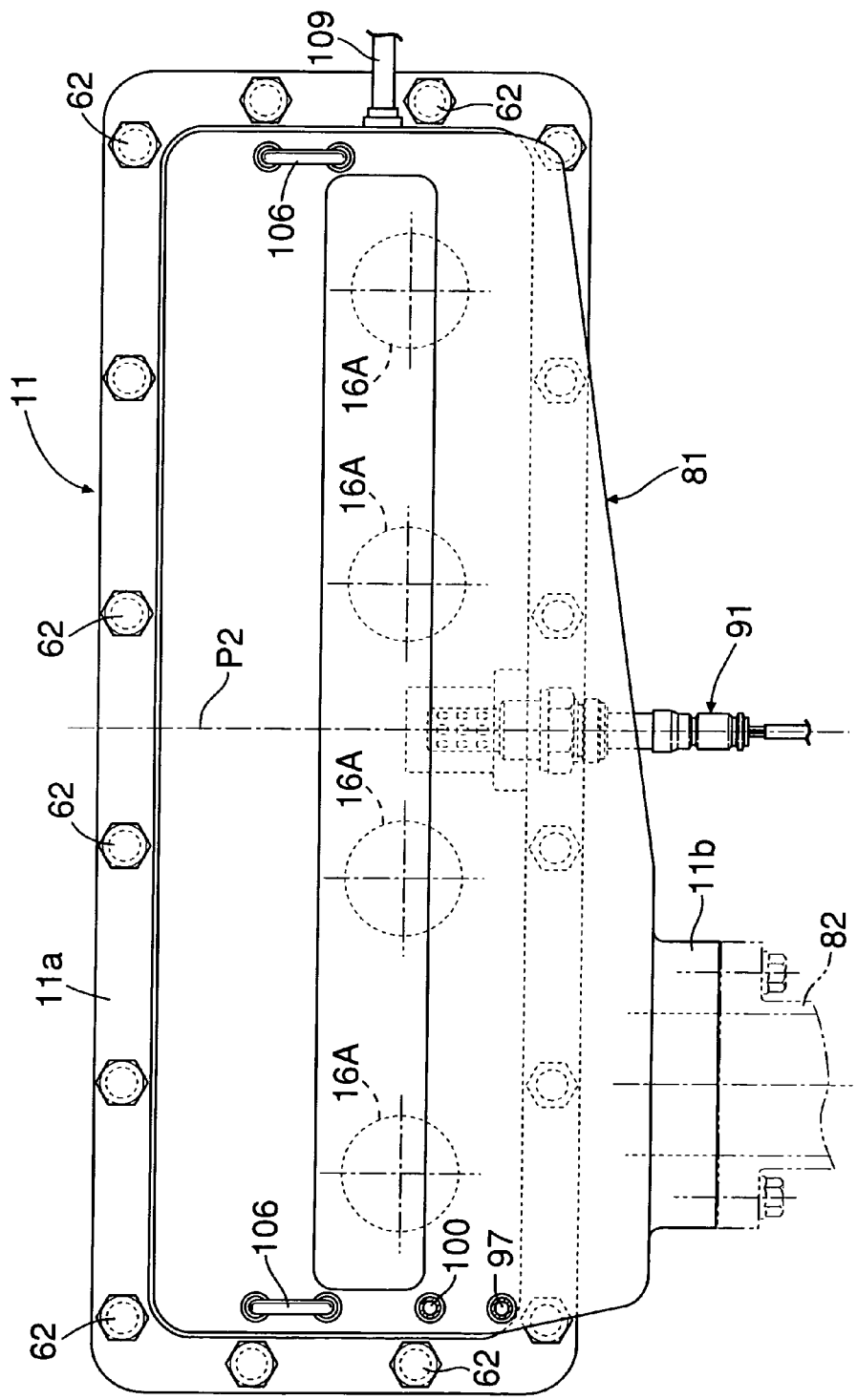
Figure 14:
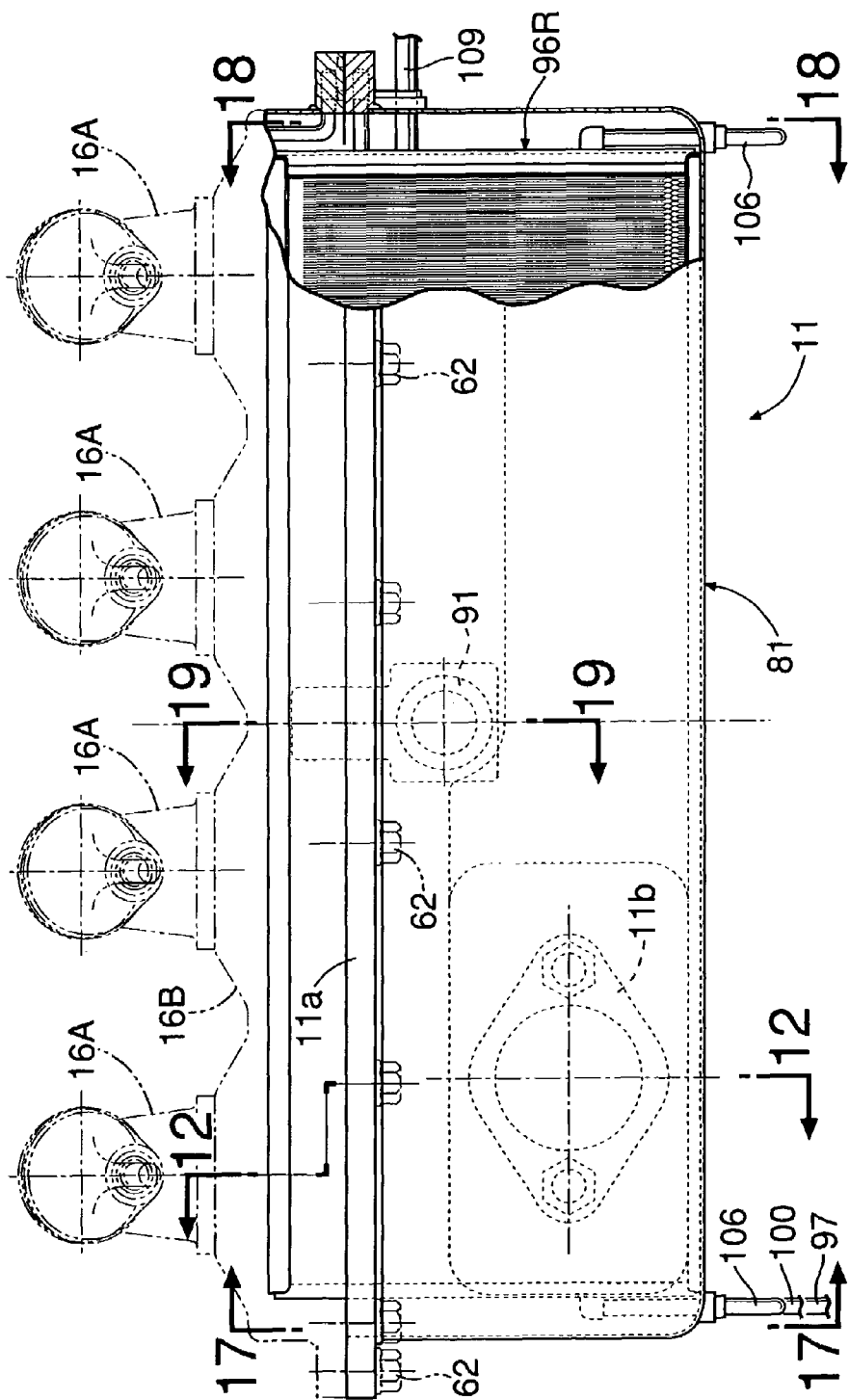

The partition wall 86 is arranged in the shape shown in FIG. 12, and forms a bent exhaust gas passage between adjacent heat transfer plates 83. The exhaust gas passage is formed from a first exhaust gas passage 87, a second exhaust gas passage 88, and a third exhaust gas passage 89, the first exhaust gas passage 87 communicating with the downstream end of the auxiliary evaporator 17 and extending linearly in a direction away from the cylinder head 20, the second exhaust gas passage 88 bending through 180° at the downstream end of the first exhaust gas passage 87 and extending linearly toward the cylinder head 20, and the third exhaust gas passage 89 bending through 180° at the downstream end of the second exhaust gas passage 88, extending in a direction away from the cylinder head 20, further bending through 90°, and extending downward so as to form an overall L-shape. An exhaust gas-combining section 81a formed within the casing 81, which the downstream end of the third exhaust gas passage 89 faces, is connected to the exhaust pipe 82 via the exhaust exit 11b. Furthermore, a gap 86a is provided by cutting away a portion of the partition wall 86 of the heat transfer plate 83 on the high temperature side of the first, second, and third exhaust gas passages 87, 88, and 89, thereby blocking heat transfer from a high temperature portion to a low temperature portion of the heat transfer plates 83 and enabling the high temperature portion and the low temperature portion to be maintained at desired temperatures.

A large number of pipe members 90, through which water circulates, run through all the heat transfer plates 83 and are joined integrally thereto by brazing so that heat transfer is possible therebetween.

Figure 15:
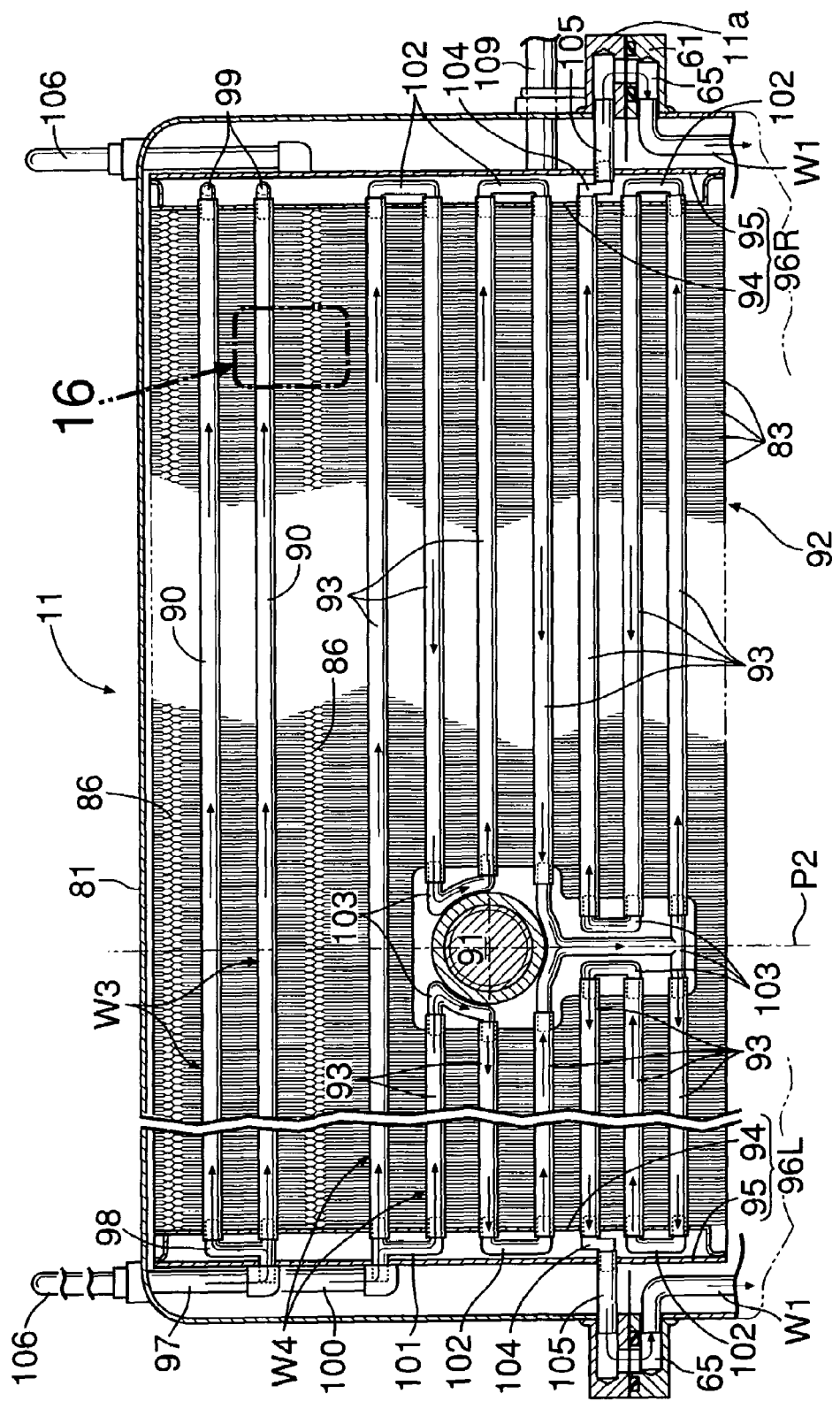
Figure 19:
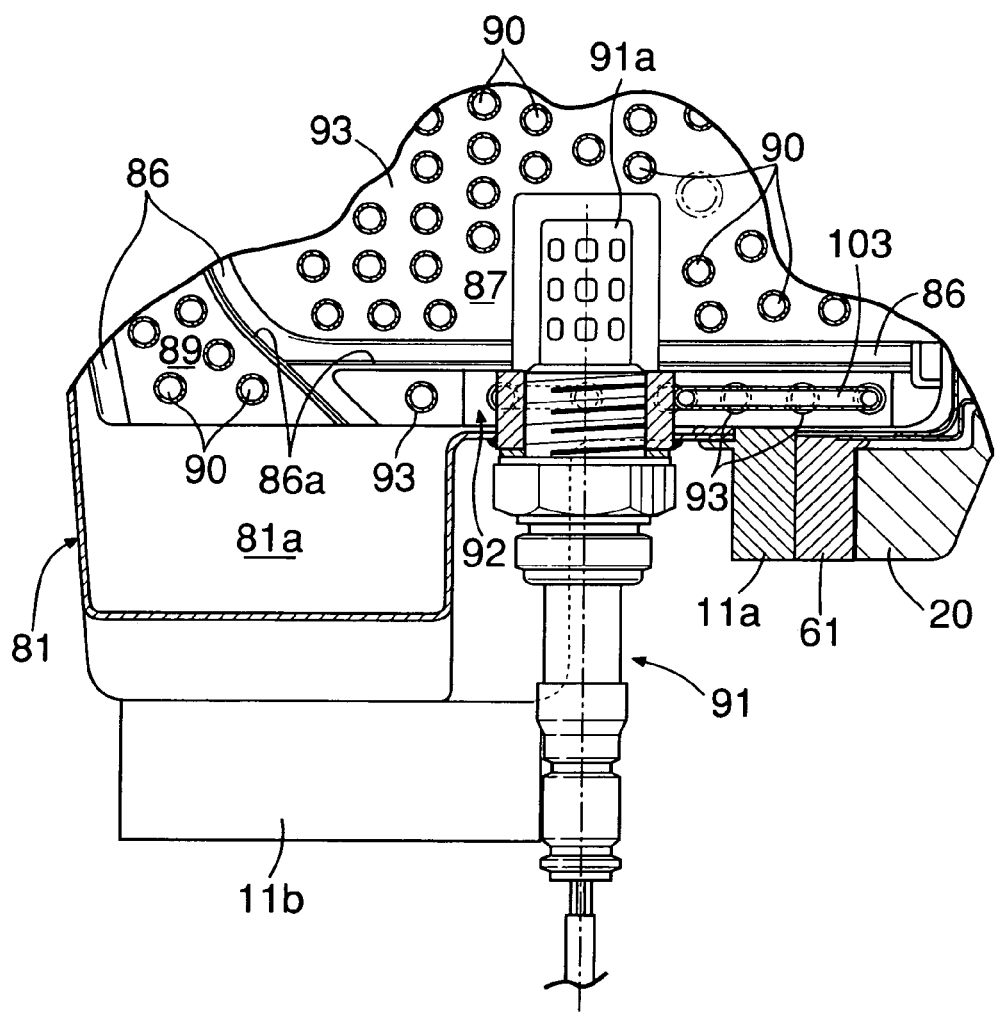
Figure 20:
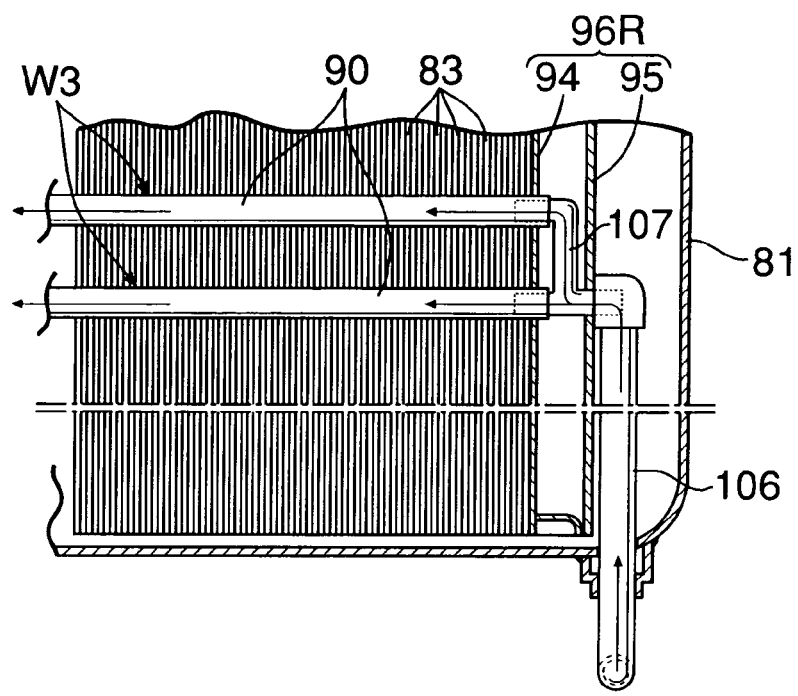

As is clear by referring additionally to FIG. 12, FIG. 15, and FIG. 19, an oxygen concentration sensor 91 is mounted on the middle of the lower face of the main evaporator 11, and a detection portion 91a at the extremity thereof faces the first exhaust gas passage 87. Provided on the lower face of the main evaporator 11 on which the oxygen concentration sensor 91 is mounted is an oxygen concentration sensor cooling portion 92, which is partitioned off beneath the first exhaust gas passage 87 via the partition wall 86. A flat upper face of the oxygen concentration sensor cooling portion 92 faces the first exhaust gas passage 87 via the partition wall 86, and a lower face thereof faces the atmosphere via the casing 81. The oxygen concentration sensor cooling portion 92 includes a plurality of pipe members 93, which run through the heat transfer plates 83 and are joined thereto by brazing.

As is most clearly shown in FIG. 15, left and right headers 96L and 96R are provided at longitudinally opposite ends of the casing 81 of the main evaporator 11, the left and right headers 96L and 96R being formed by integrally connecting inner plates 94 and outer plates 95 with a predetermined gap therebetween. Each of the headers 96L, 96R has the inner plate 94 thereof superimposed on the heat transfer plate 83 that is layered on the outermost side. A water inlet pipe 97 communicating with the downstream side of the supply pump 15 runs through a rear face of the casing 81 of the main evaporator 11, reaches the outer face of the outer plate 95 of the left-hand (when facing the cylinder head 20) header 96L, and is connected via a bifurcated coupling 98 to two of the pipe members 90 positioned at the downstream end of the third exhaust gas passage 89.

These two pipe members 90 form the beginning of two lines of water passages W3, and adjacent pipe members 90 of each line are sequentially connected via U-shaped couplings 99 in the left and right headers 96L and 96R, thus forming the water passages W3 in a zigzag shape. As is clear from FIG. 22, the direction of flow of water in the water passages W3 is opposite to the direction of flow of exhaust gas, which is in the direction first exhaust gas passage 87→second exhaust gas passage 88→third exhaust gas passage 89, that is, the flow of water is from the third exhaust gas passage 89 to the first exhaust gas passage 87 via the second exhaust gas passage 88. That is, the exhaust gas and the water have a countercurrent arrangement.

As is clear from FIG. 12, the density of the pipe members 90 is the most sparse in the first exhaust gas passage 87, which is on the upstream side of the flow of exhaust gas, moderate in the second exhaust gas passage 88, which is in the middle, and the most dense in the third exhaust gas passage 89, which is on the downstream side.

As is clear from FIG. 15, a water inlet pipe 100 communicating with the downstream side of the supply pump 15 runs through a rear face of the casing 81 of the main evaporator 11 and reaches an outer face of the outer plate 95 of the left-hand (when facing the cylinder head 20) header 96L, and is connected to two of the pipe members 93 via a bifurcated coupling 101. These two pipe members 93 form the beginning of two lines of water passages W4, and adjacent pipe members 93 of each line are connected via U-shaped couplings 102 in the left and right headers 96L and 96R and via five couplings 103 in a space surrounding the oxygen concentration sensor 91, thus forming the water passages W4 in a zigzag shape. The downstream ends of the two line water passages W4 communicate via couplings 104 and connecting pipes 105 with the water inlets 65 (see FIG. 5) of the auxiliary evaporator 17 formed within the flanges 11a and 61.

Figure 17:
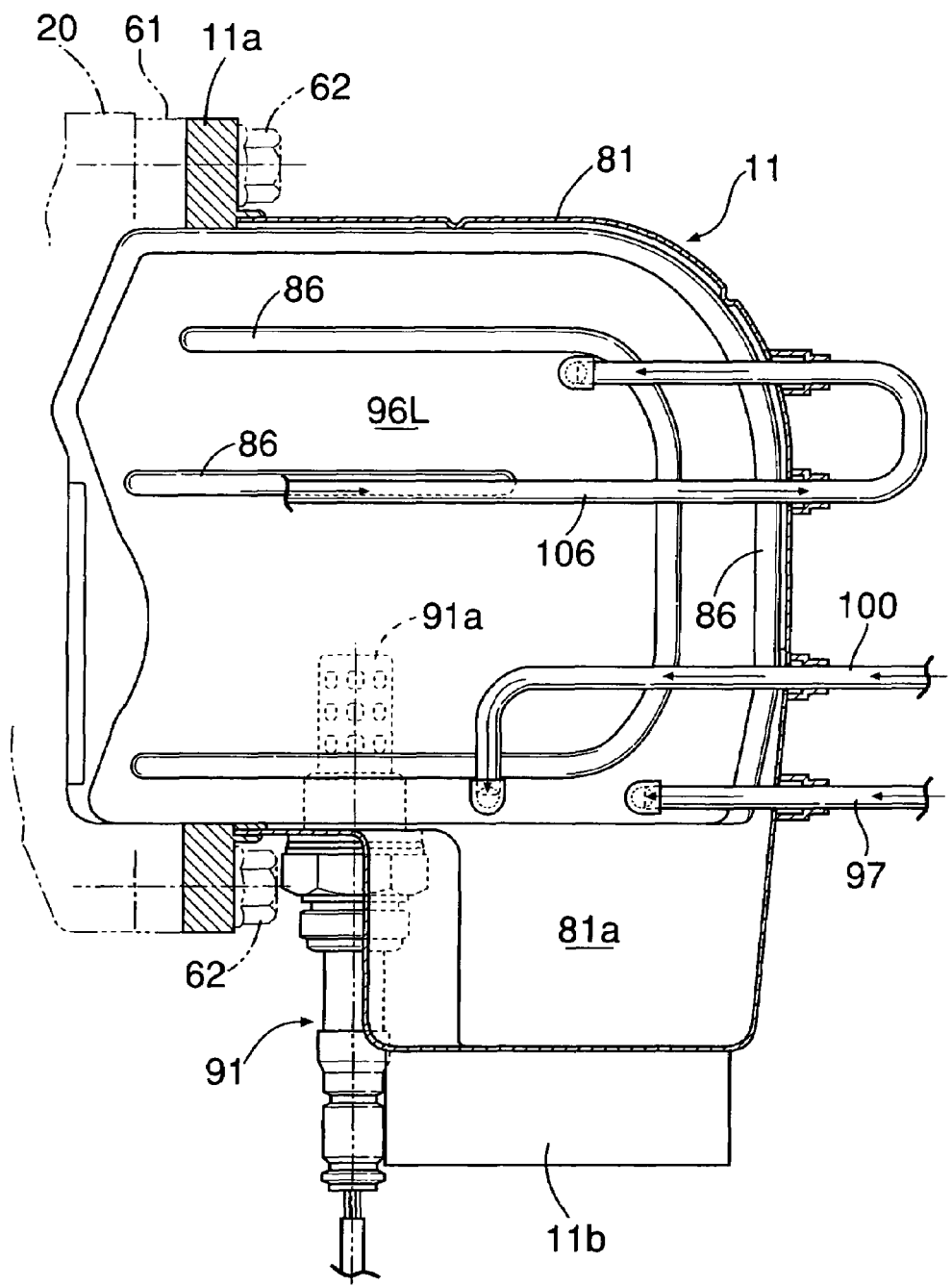
Figure 18:
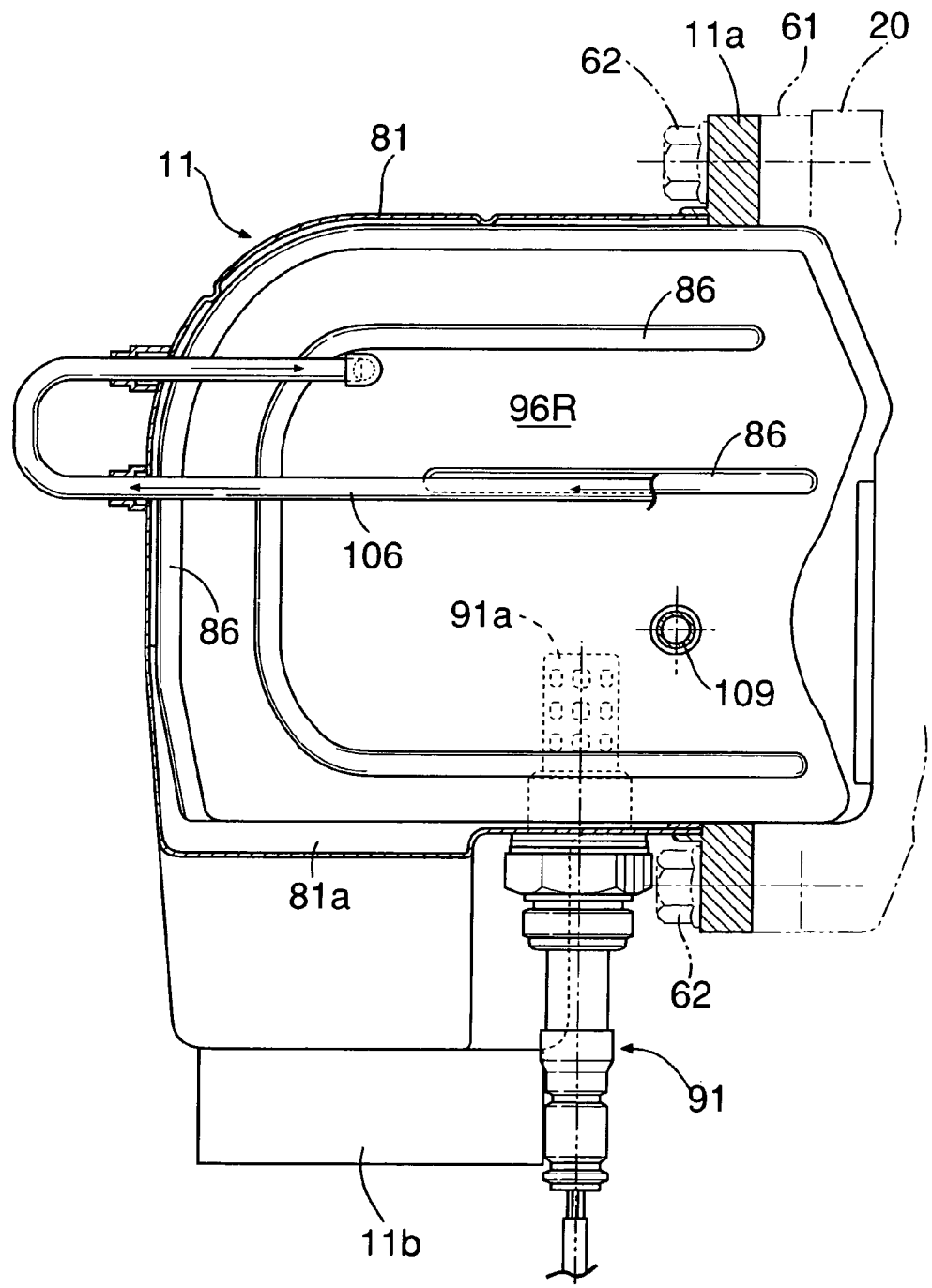
Figure 21:
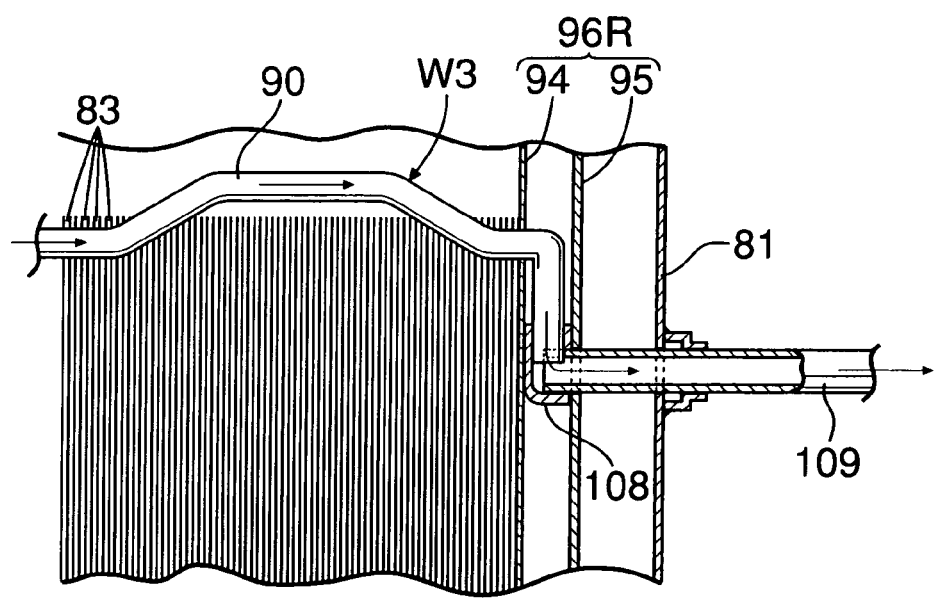

As shown in FIG. 17, FIG. 18, and FIG. 21, the two connecting pipes 106 communicating with the water outlets of the water passages W2 of the auxiliary evaporator 17 extend to the exterior of the casing 81 through the outside of the headers 96L and 96R, bend through 180°, re-enter the interior of the casing 81, and are connected to the pipe members 90 of the cooling water passages W3 via bifurcated couplings 107 provided in the headers 96L and 96R. The position of the pipe members 90 connected to the connecting pipes 106 is in the vicinity of the upstream end of the second exhaust gas passage 88 as shown by the reference numerals 90(1) and 90(2) in FIG. 22.

Figure 22:
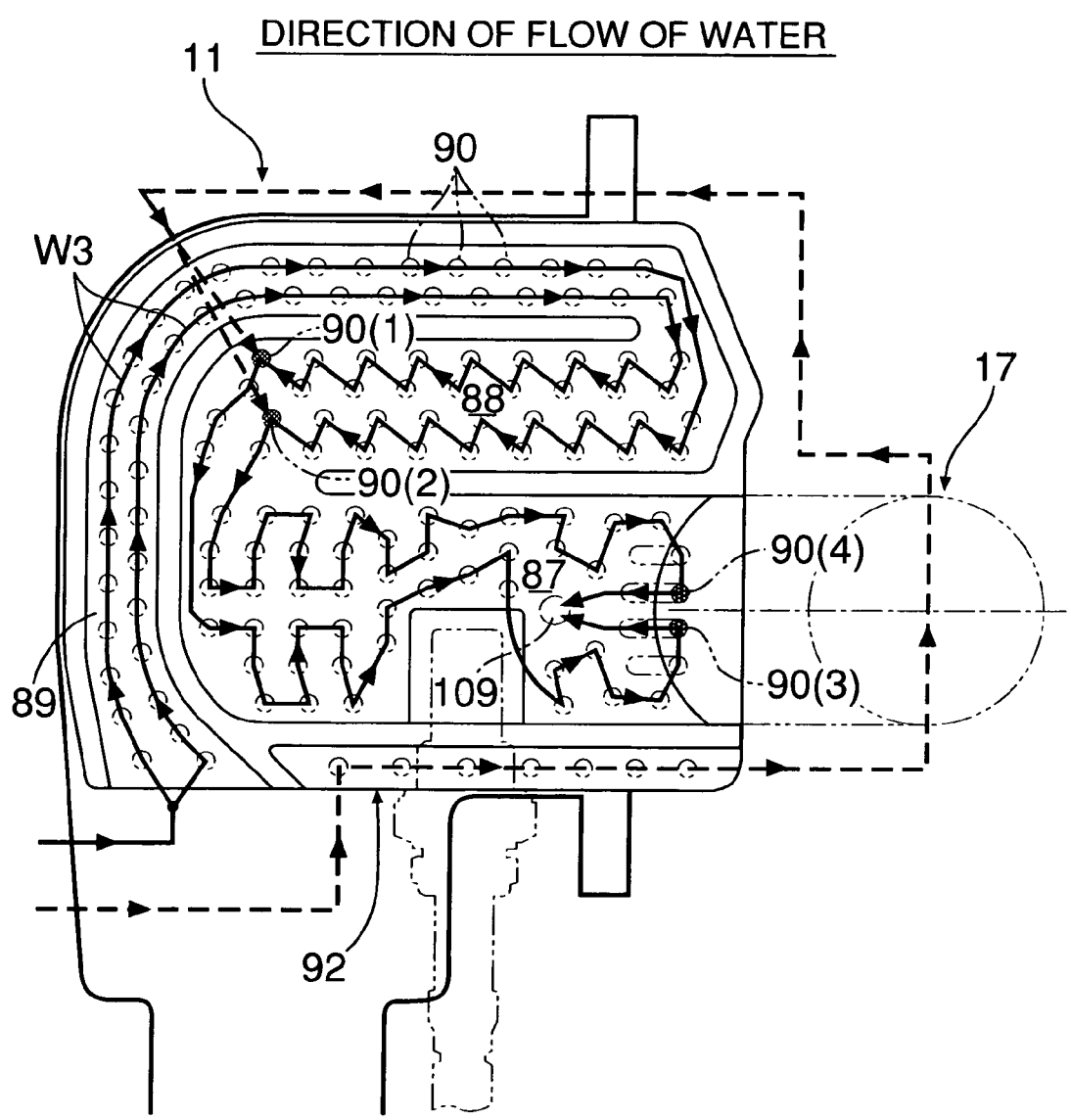

As shown in FIG. 21, in the right-hand header 96R, the two pipe members 90 (shown by the reference numerals 90(3) and 90(4) in FIG. 22) positioned at the downstream end of the water passages W3 are connected via a bifurcated coupling 108 to a water outlet pipe 109 that communicates with the expander 12.

The operation of the embodiment of the present invention having the above-mentioned arrangement is now explained.

In FIG. 1, a portion of the water discharged from the supply pump 15 of the Rankine cycle system is supplied to the main evaporator 11, which is provided downstream of the exhaust port 16 of the internal combustion engine E, and the rest of the water discharged from the supply pump 15 passes through the auxiliary evaporator 17 provided on the outer periphery of the exhaust port 16 and merges into the main evaporator 11 at a predetermined position.

The operation in the main evaporator 11 is first explained. A portion of the low temperature water discharged from the supply pump 15 flows to the left header 96L of the casing 81 of the main evaporator 11 via the water inlet pipe 97 (see FIG. 15), and the flow is divided into the two lines of water passages W3 via the coupling 98. Each of the water passages W3 is formed from the large number of pipe members 90 connected in a zigzag shape, and carries out heat exchange with the exhaust gas passing through the gaps between the large number of heat transfer plates 83, through which the pipe members 90 run, thereby depriving the exhaust gas of thermal energy and increasing in temperature. The two pipe members 90 at the downstream end of the two lines of water passages W3 are merged with the water outlet pipe 109 (see FIG. 21) via the coupling 108. The water is heated and turns into high temperature, high pressure steam while flowing through the water passages W3, and is supplied to the expander 12.

Since the heat of the exhaust gas is transferred from the large number of heat transfer plates 83, which have a large surface area and are arranged at a small pitch, to the water flowing through the large number of pipe members 90, it is possible to ensure that there is a sufficient area of heat exchange between the exhaust gas and the water. Accordingly, even when the flow rate of the exhaust gas is reduced, that is, when the cross-sectional area of the exhaust gas flow path in the main evaporator 11 is increased, sufficient heat exchange efficiency can be obtained, and suppressing an increase in the back pressure of the exhaust passage can prevent any decrease in the output of the internal combustion engine E. Furthermore, when pressing the heat transfer plates 83, the partition wall 86 can be provided in any shape by forming only the abutment sections 84 and 85, and the first to third exhaust gas passages 87, 88, and 89, which are bent, can be formed without employing any special component for providing the partition wall 86.

Figure 23:
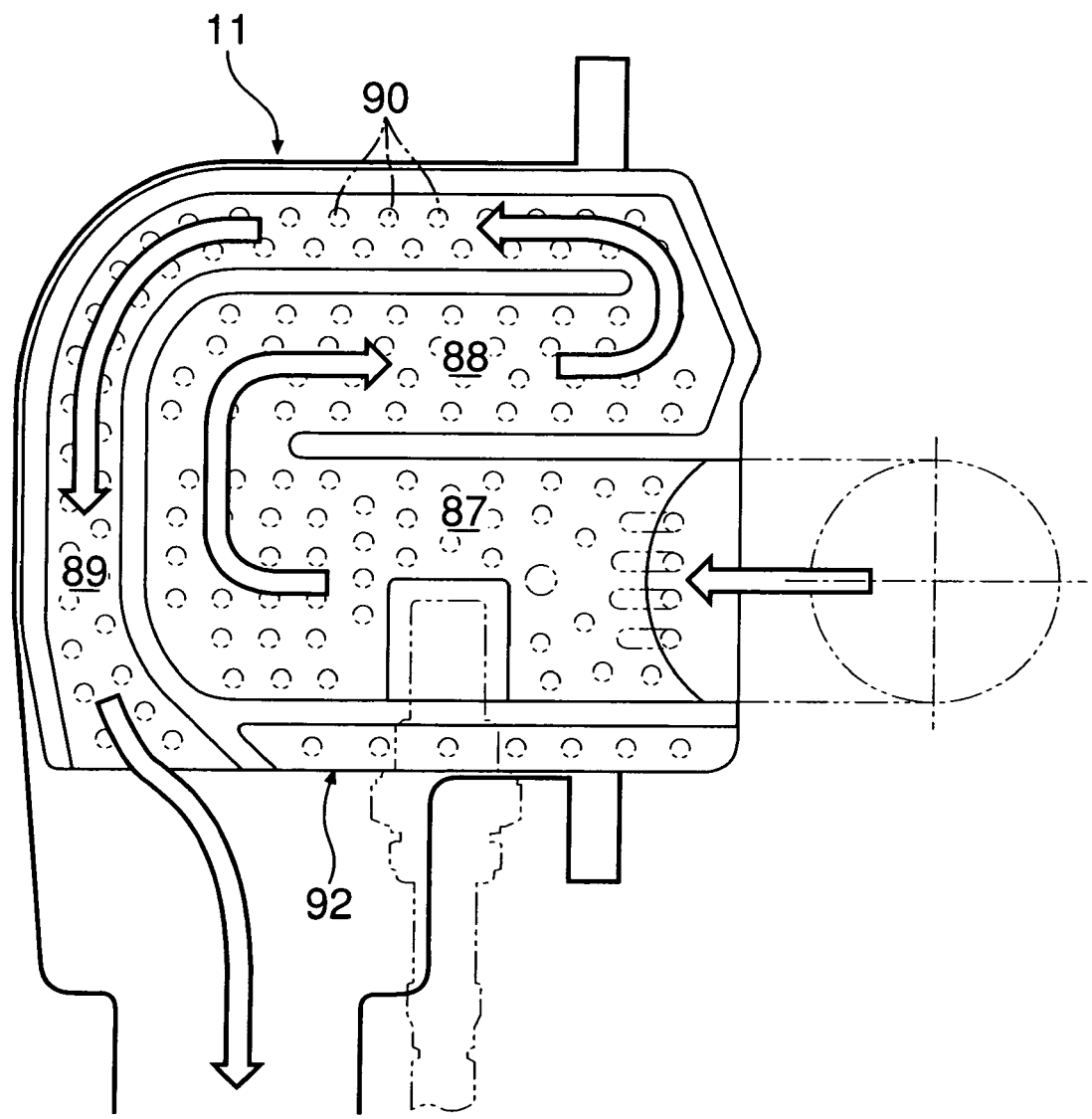

Moreover, as is clear from FIG. 22 and FIG. 23, whereas the exhaust gas flows from the first exhaust gas passage 87 to the third exhaust gas passage 89 via the second exhaust gas passage 88, water within the water passages W3 flows from the third exhaust gas passage 89 to the first exhaust gas passage 87 via the second exhaust gas passage 88 so as to oppose the direction of flow of the exhaust gas, thereby ensuring that there is sufficient temperature difference between the water and the exhaust gas along the whole length of the water passages W3 and improving the heat exchange efficiency of the main evaporator 11.

Furthermore, since the density of the pipe members 90 is low in the first exhaust gas passage 87, which is on the upstream side of the flow of the exhaust gas, and the density of the pipe members 90 gradually increases therefrom toward the third exhaust gas passage 89, which is on the downstream side, by reducing the density of the pipe members 90 in the upstream section where the exhaust gas has a high temperature and a large volume and the flow rate is high it is possible to minimize the pressure loss due to impingement of the exhaust gas on the pipe members 90, and by increasing the density of the pipe members 90 in the downstream section where the exhaust gas has a low temperature and a small volume and the flow rate is low it is possible to ensure that there is sufficient contact between the exhaust gas and the pipe members 90 and improve the heat exchange efficiency.

Moreover, since the exhaust gas purification catalyst is supported on the heat transfer plates 83, which have a large surface area, it is possible to ensure that the exhaust gas makes sufficient contact with the exhaust gas purification catalyst, thereby cleaning the exhaust gas effectively.

The rest of the low temperature water discharged from the supply pump 15 enters the interior of the left-hand header 96L of the casing 81 of the main evaporator 11 via the water inlet pipe 100 (see FIG. 15), and the flow thereof is divided into the two lines of water passages W4 via the coupling 101. Water that has flowed in a zigzag shape through the interior of the pipe members 93 forming each of the water passages W4 is first merged in the H-shaped coupling 103 in the vicinity of the oxygen concentration sensor 91, is then divided again, further flows in a zigzag shape through the interior of the pipe members 93, then flows from the left and right headers 96L and 96R through the couplings 104, the connecting pipes 105, and the water inlets 65, and is then supplied to the auxiliary evaporator 17.

In this way, since the surroundings of the oxygen concentration sensor 91, which passes through the oxygen concentration sensor cooling portion 92, are cooled by the low temperature water flowing through the water passages W4, the heat of the high temperature exhaust gas flowing through the first exhaust gas passage 87, which the detection portion 91a of the oxygen concentration sensor 91 faces, can be prevented from escaping to the outside of the main evaporator 11 via the oxygen concentration sensor 91, thereby improving the efficiency of recovery of waste heat of the internal combustion engine E.

Furthermore, since the first exhaust gas passage 87 and the second exhaust gas passage 88, which are positioned on the upstream side of the flow of exhaust gas and through which the high temperature exhaust gas flows, are disposed in a radially inner portion of the main evaporator 11, the third exhaust gas passage 89, which is positioned on the downstream side of the flow of exhaust gas and to which water having the lowest temperature is supplied, is disposed in a radially outer portion of the main evaporator 11, and the oxygen concentration sensor cooling portion 92, to which water having the lowest temperature is supplied, is disposed in a radially outer portion of the main evaporator 11, that is, since the outsides of the first exhaust gas passage 87 and the second exhaust gas passage 88, which reach a high temperature due to the passage of high temperature exhaust gas, are surrounded by the third exhaust gas passage 89 and the oxygen concentration sensor cooling portion 92, which reach a low temperature due to the passage of low temperature water, it is possible to minimize the dissipation of thermal energy to the outside of the main evaporator 11, thereby improving the waste heat recovery efficiency.

A gap that maintains an air layer is formed between the inner periphery of the casing 81 and the outer periphery of the heat transfer plates 83, and the heat insulating effect of this air layer can further reduce the dissipation of thermal energy to the outside of the main evaporator 11.

The operation in the auxiliary evaporator 17 is now explained. In FIG. 11A and FIG. 11B, water discharged from the oxygen concentration sensor cooling portion 92 flows into the water passage W1 from the water inlet 65 of the grouped exhaust port 16B and the flow is divided into the first line and the second line. The first line shown in FIG. 11A has a route that reaches the water outlet 68 via the part f and the part g of the water passage W1, the coupling 66, the water passage W2 of the independent exhaust port 16A(1), the coupling 67, and the part h, the part i, and the part j of the water passage W1. On the other hand, the second line shown in FIG. 11B has a route that reaches the water outlet 68 via the part f, the part g, the part k, the part m, the part n, and the part o of the water passage W1, the coupling 69, the water passage W2 of the independent exhaust port 16A(2), and the part j of the water passage W1. Since in the first line the first half of the water passage W1 is short and the second half thereof is long, and in the second line the first half of the water passage W1 is long and the second half thereof is short, the overall length of the water passage W1 in the two lines is equalized, thus making the amount supplied substantially equal, preventing an imbalance in the waste heat recovery, and improving the heat exchange efficiency.

As shown in FIG. 7 to FIG. 10, the structures of the water passages W2 provided in the two independent exhaust ports 16A(1) and 16A(2) are identical, and water supplied from the water inlet 59 branches so as to sandwich the plane of symmetry P1, passes through the part a, the part b, the part c, the part d, and the part e, is merged, and is then discharged via the water outlet 60.

In this way, since the auxiliary evaporator 17 is arranged so that the surroundings of the exhaust port 16, which reach a high temperature due to the passage of exhaust gas, are surrounded by the water passages W1 and W2, the exhaust gas heat dissipated from the exhaust port 16 via the cylinder head 20 can be recovered effectively as high temperature, high pressure steam. In particular, since the water supplied to the water passages W1 and W2 is comparatively low temperature water that has only passed through the oxygen concentration sensor cooling portion 92 after being discharged from the supply pump 15, the surroundings of the exhaust port 16 can be cooled effectively, and high temperature, high pressure steam can be generated, thus enhancing the waste heat recovery effect of the internal combustion engine E. Furthermore, although the heat of exhaust gas easily escapes to the outside via the exhaust valve 30, intensive cooling, with low temperature water, of the section that requires cooling of the internal combustion engine E, that is, the exhaust valve seat 29, with which the head 30a of the exhaust valve 30 makes contact, and the vicinity of the exhaust valve guide 40, with which the stem 30b of the exhaust valve 30 makes contact, enables the escape of heat via the exhaust valve 30 to be suppressed, thus further enhancing the waste heat recovery effect, and enables thermal expansion of the exhaust valve 30, the exhaust valve seat 29, and the exhaust valve guide 40, etc. to be suppressed, thus maintaining dimensional and positional precision and thereby maintaining desired functions thereof.

Water that has passed through the auxiliary evaporator 17 passes from the connecting pipes 106 (see FIG. 17 and FIG. 18) through the couplings 107 (see FIG. 20) provided in the left and right headers 96L and 96R, and is merged in the pipe members 90 of the second exhaust gas passage 88 of the main evaporator 11. In this arrangement, by making, in the merging section, the temperature of water passing through the water passages W3 on the main evaporator 11 side substantially equal to the temperature of water supplied from the auxiliary evaporator 17, the waste heat recovery effect can be further improved. This control of water temperature can be carried out by regulating the flow rate ratio when splitting the flow of water discharged from the supply pump 15 into the main evaporator 11 side and the auxiliary evaporator 17 side.

Although an embodiment of the present invention is explained in detail above, the present invention can be modified in a variety of ways without departing from the spirit and scope of the present invention.

For example, in the embodiment the heat exchanger is exemplified by the evaporators 11 and 17, but the heat exchanger of the present invention is not limited to an evaporator.

Furthermore, in the embodiment water is illustrated as the heat medium, but the heat medium of the present invention is not limited to water.

INDUSTRIAL APPLICABILITY

Although the present invention can be suitably applied to an evaporator for a Rankine cycle system and, in particular, to an evaporator for a Rankine cycle system that recovers the thermal energy of the exhaust gas of an internal combustion engine of an automobile and converts it into mechanical energy, the present invention can also be applied to a heat exchanger for any purpose.

What is claimed is:

1. A heat exchange system for recovering, with a heat medium, the thermal energy of a high temperature fluid flowing through the interior of a fluid passage extending from a heat source, said heat exchange system comprising:
   a first heat exchanger positioned on the upstream side of the fluid passage; and
   a second heat exchanger positioned on the downstream side of the fluid passage,
   wherein the heat medium flows through an interior of a first heat medium passage provided in the first heat exchanger, so as to be parallel to the flow of the high temperature fluid, the heat medium flows through an interior of a second heat medium passage provided in the second heat exchanger, so as to oppose the flow of the high temperature fluid, and a downstream side of the first heat medium passage merges with the second heat medium passage at a location within the second heat exchanger.

2. The heat exchange system according to claim 1, wherein in a section where the first heat medium passage and the second heat medium passage merge, the temperature of the heat medium in the first heat medium passage and the temperature of the heat medium in the second heat medium passage are made substantially identical to each other.

3. A heat exchange system for recovering, with a heat medium, the thermal energy of a high temperature fluid flowing through the interior of a fluid passage extending from a heat source, said heat exchange system comprising:
   a first heat exchanger positioned on the upstream side of the fluid passage; and
   a second heat exchanger positioned on the downstream side of the fluid passage,
   wherein the heat medium flows through an interior of a first heat medium passage provided in the first heat exchanger, so as to be parallel to the flow of the high temperature fluid, the heat medium flows through an interior of a second heat medium passage provided in the second heat exchanger, so as to oppose the flow of the high temperature fluid, and a downstream side of the first heat medium passage merges with the second heat medium passage so that the heat medium inside the second heat medium passage, after having flown in a direction opposite the flow of the high temperature fluid at the second heat exchanger, merges with the heat medium from the first heat medium passage.

4. The heat exchange system according to claim 3, wherein the downstream side of the first heat medium passage merges with the second heat medium passage at a location between an inlet and an outlet of the second heat exchanger.

5. The heat exchange system according to claim 3, wherein the heat medium flowing to the first heat exchanger first passes through a third heat medium passage provided in the second heat exchanger.

6. The heat exchange system according to claim 3, wherein the temperature of the heat medium in the first heat medium passage and the temperature of the heat medium in the second heat medium passage are made substantially identical to each other at the location where the downstream side of the first heat medium passage merges with the second heat medium passage.

7. The heat exchange system according to claim 6, wherein the internal combustion engine comprises a plurality of combustion chambers, the exhaust port comprises a plurality of independent exhaust ports extending from the respective combustion chambers and a grouped exhaust port communicating with the downstream side of each of the plurality of independent exhaust ports, at least one section of the first heat exchanger is provided in the independent exhaust ports, and at least one section of the second heat exchanger is provided in the grouped exhaust port.

8. The heat exchange system according to claim 6, further comprising a supply pump for pumping a portion of the heat medium to the first heat medium passage and a portion of the heat medium to the second heat medium passage, wherein the temperature of the heat medium in the first and second heat medium passages are made substantially identical to each other by controlling a flow rate ratio of the heat medium pumped to the first and second heat medium passages.

9. The heat exchange system according to claim 6, wherein the first heat medium passage of the first heat exchanger is provided so as to cover the exhaust port of the internal combustion engine.

10. The heat exchange system according to claim 9, wherein an upstream section of the first heat medium passage cools a section of the exhaust port that requires cooling.

11. The heat exchange system according to claim 3, wherein in a section where the first heat medium passage and the second heat medium passage merge, the temperature of the heat medium in the first heat medium passage and the temperature of the heat medium in the second heat medium passage are made substantially identical to each other.

12. The heat exchange system according to claim 11, wherein the downstream side of the first heat medium passage merges with the second heat medium passage at a location between an inlet and an outlet of the second heat exchanger.

13. The heat exchange system according to claim 11, further comprising a supply pump for pumping a portion of the heat medium to the first heat medium passage and a portion of the heat medium to the second heat medium passage, wherein the temperature of the heat medium in the first and second heat medium passages are made substantially identical to each other by controlling a flow rate ratio of the heat medium pumped to the first and second heat medium passages.

14. The heat exchange system according to either claim 3 or claim 11, wherein the heat source is a combustion chamber of an internal combustion engine, the high temperature fluid is exhaust gas discharged from the combustion chamber, and the first heat exchanger is provided in the vicinity of an exhaust port of the internal combustion engine.

15. The heat exchange system according to claim 14, wherein the internal combustion engine comprises a plurality of combustion chambers, the exhaust port comprises a plurality of independent exhaust ports extending from the respective combustion chambers and a grouped exhaust port communicating with the downstream side of each of the plurality of independent exhaust ports, at least one section of the first heat exchanger is provided in the independent exhaust ports, and at least one section of the second heat exchanger is provided in the grouped exhaust port.

16. The heat exchange system according to claim 14, wherein the first heat medium passage of the first heat exchanger is provided so as to cover the exhaust port of the internal combustion engine.

17. The heat exchange system according to claim 16, wherein an upstream section of the first heat medium passage cools a section of the exhaust port that requires cooling.

* * * * *